United States Patent
Ikeda et al.

(10) Patent No.: US 6,801,296 B2
(45) Date of Patent: Oct. 5, 2004

(54) IMAGE PROCESSING METHOD, IMAGE PROCESSING APPARATUS AND IMAGE RECORDING APPARATUS

(75) Inventors: Chizuko Ikeda, Tokyo (JP); Tsukasa Ito, Musashino (JP); Hiroaki Takano, Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 10/366,995

(22) Filed: Feb. 14, 2003

(65) Prior Publication Data

US 2003/0156838 A1 Aug. 21, 2003

(30) Foreign Application Priority Data

Feb. 21, 2002 (JP) ........................................ 2002-044812

(51) Int. Cl.[7] .......................... G03B 27/52; G03B 27/80
(52) U.S. Cl. .......................... 355/38; 355/40; 355/41; 355/68; 355/69; 355/77; 396/125; 396/567; 382/274; 348/223.1; 348/225.1; 358/516; 358/530
(58) Field of Search .......................... 355/38, 40, 41, 355/68, 69, 77; 396/125, 310, 567–570; 382/274; 358/516, 530

(56) References Cited

U.S. PATENT DOCUMENTS

| | | | |
|---|---|---|---|
| 5,617,175 A | * | 4/1997 | Asakura et al. ............. 396/310 |
| 6,330,051 B1 | * | 12/2001 | Takanashi ..................... 355/40 |

FOREIGN PATENT DOCUMENTS

| | | |
|---|---|---|
| JP | 07-322274 | 12/1995 |
| JP | 2001-177732 | 6/2001 |
| JP | 2001-238177 | 8/2001 |
| JP | 2001-261825 | 9/2001 |

* cited by examiner

Primary Examiner—D. Rutledge
(74) Attorney, Agent, or Firm—Cantor Colburn LLP

(57) ABSTRACT

An image processing method to conduct an image processing on image signals indicating an image obtained through photographing by a photographing apparatus for generating image signals for output. The image processing method has a determining process to determine a content of image processing to be conducted on the image signals based on information about environment light in the course of photographing, information about flashlight in the course of photographing, and on at least one of information about zoom magnification in the course of photographing and information about ISO speed.

83 Claims, 7 Drawing Sheets

IMAGE PROCESSING METHOD, IMAGE PROCESSING APPARATUS AND IMAGE RECORDING APPARATUS

BACKGROUND OF THE INVENTION

The present invention relates to an image processing method, an image processing apparatus and an image recording apparatus.

In recent years, when outputting image signals indicating images photographed by a photographing apparatus (to be concrete, image data generated through photographing by a digital camera or the like, image data obtained by making photographed images to be electronic ones with a film scanner or a flat bed scanner, and data generated when the aforementioned data are processed or converted in terms of format by various application programs) from an output apparatus such as a printing apparatus or a display apparatus, prescribed image processing is generally conducted on the image signals corresponding to output images for giving favorable impression to a person who observes the output images.

For example, as a known technology, there is a white balance adjustment function. The white balance adjustment function is a function to adjust a balance of a color that changes depending on a light source, and when this white balance adjustment function is not used, when a subject that is white under a fluorescent lamp is photographed, the white subject becomes greenish, and when a subject that is white under a tungsten lamp is photographed, the white subject becomes reddish, because of characteristics (color temperature) of light that varies depending on a light source (environment light) such as sunlight, a tungsten lamp and a fluorescent lamp. Therefore, color correction is conducted for adjustment by the white balance adjustment function, so that a white subject may be photographed to be white.

Further, there have been disclosed various technologies for correcting a gap between an impression which was caused by an influence of flashlight in flash photographing, in addition to color temperature according to environment light in the course of photographing, and was given to a photographer in the course of photographing, and an impression which was given by an image obtained through photographing by a photographing apparatus, and for correcting to express an image or a color preference desired by a customer.

For example, TOKKAIHEI No. 7-322274 discloses an image processing method that can reproduce images having an excellent white balance, by conducting gamma correction for R, G and B signals based on color temperature information recorded in each frame on a magnetic recording layer of a developed still photo-film, and thereby by correcting color temperature in photographing, with respect to image signals obtained through scanning of frame images on the developed still photo-film. There is further disclosed simultaneously an image processing method which prevents that a subject turns black by controlling correction and conducting image processing for halftone when conducting gamma correction for RGB signals based on backlight information recorded in each frame on a magnetic recording layer.

Further, in TOKKAI No. 2000-261825, there are disclosed an image processing method and a processing apparatus wherein color conversion is conducted based on specified information wherein color temperature which is desired by a user to be outputted is expressed with sensitive-expression such as "sober" when color temperature owned by images is changed and outputted, and output images with impression according to an image of a person who observes is obtained.

Further, in TOKKAI No. 2001-238177, there are disclosed an image processing method and an image processing apparatus wherein image data of photographing scene of a subject is obtained in a camera, then, camera information obtained or inputted in photographing of a subject is obtained, and further when occasion demands, related information concerning this photographing scene is taken in, and photographing scene is estimated by at least one of camera information and related information or by a combination of this and image data, and prescribed image processing according to the estimated photographing scene is conducted.

Further, in TOKKAI No. 2001-177732, there is disclosed an image processing apparatus wherein environment light information, flash information and an object distance in flash photographing are obtained, and in accordance with information of the aforesaid information, color reproduction condition that differs for each image area is established, and image processing is conducted so that a principal subject and a background may show suitable color preference.

However, when recent diversification of generating means for image signals indicating exposed images, including an inexpensive digital camera for toy use, a lens shutter digital camera, an SLR high-grade digital camera, a film scanner and a flat-bed scanner, diversification of photographing surroundings and photographing scenes which advance following the aforementioned diversification of generating means for image signals, and demands of customers for further high quality are considered, it cannot be said that all of them have sufficient effects.

The technology disclosed in the aforesaid TOKKAIHEI No. 7-322274 is one wherein the proposed image processing is based on color temperature information recorded in each frame on a magnetic recording layer of a developed still photo-film, and an image on a developed still photo-film having no magnetic recording layer and an image photographed by a digital camera are not taken into consideration, which makes the aforesaid technology to be poor in versatility. In addition, information is written is written or no information is written, depending on camera types and performances, which also makes the aforesaid technology to be poor in versatility. Further, the technology cannot be applied to the scene that is controlled, as in flash photographing, by plural light sources such as environment light and flashlight, because a color temperature varies depending on an area in the image.

Further, the technology disclosed in TOKKAI No. 2000-261825 is one in which color conversion is conducted based on specified information wherein color temperature which is desired by a user to be outputted is expressed with sensitive expression such as "sober", in which one sensitive expression corresponds to one color temperature value. However, an image imagined by a user from the sensitive expression is various and is not univocal, which makes it difficult to say positively that customers are fully satisfied.

The technology disclosed in the aforesaid TOKKAI No. 2001-238177 is one wherein image data of photographing scene of a subject photographed in a camera are obtained, then, camera information obtained or inputted in the course of photographing a subject and related information concerning the photographing scene are obtained, and photographing scene is estimated by the use of the obtained information so that prescribed image processing is conducted in accordance with the estimated photographing scene. This technology, however, does not pay any attention to the scene controlled by plural light sources (namely, fluorescent or tungsten lamp and flashlight) as in flash photographing under a fluorescent lamp or a tungsten lamp (namely, indoors), for example, and the technology cannot cope with the image for which the controlling light source varies depending on an area in the image.

The technology disclosed in the aforesaid TOKKAI No. 2001-177732 is one wherein environment light information, flash information and an object distance are obtained, then, a color reproduction condition that varies depending on each area in the image is established in accordance with the aforesaid information, and image processing is conducted so that a principal subject and a background may show suitable color preference. However, the technology does not pay any attention to the fact that an effective area and an effective light amount of flashlight for the area for a subject to be photographed are dependent greatly not only on the object distance but also on a zoom magnification and ISO speed.

Subjects of the invention are to solve the problems in the conventional art stated above, and to conduct prescribed image processing about image signals indicating images exposed under plural light sources, by the simple and all-purpose means that can cope with various photographing surroundings, photographing conditions, various photographing apparatuses and various image signal generating apparatuses, so that image signals which can give favorable impression to an observer.

SUMMARY OF THE INVENTION

The invention includes the following structures to attain the subjects stated above.

Structure (1)

An image processing method conducting image processing on image signals indicating images obtained through photographing by a photographing apparatus and generating image signals for output use, wherein there is included a determining process that determines contents of image processing to be conducted on the image signals based on information about environment light in the course of photographing, information about flashlight in the course of photographing, and on at least one of information about zoom magnification in the course of photographing and information about ISO speed.

Structure (2)

The image processing method according to Structure (1), wherein contents of image processing to be conducted on the aforesaid image signals are further determined in the determining process stated above, based on information about an object distance in the course of photographing.

Structure (3)

An image processing method conducting image processing on image signals indicating images obtained through photographing by a photographing apparatus and generating image signals for output use, wherein there are included a mixed area estimating process that estimates whether an area irradiated by both of environment light and flashlight is present in the image or not, based on information about environment light in the course of photographing and information about flashlight in the course of photographing, and a determining process that determines contents of the image processing based on at least one of information-about zoom magnification in the course of photographing and information about ISO speed and on results of estimation in the mixed area estimating process.

Structure (4)

The image processing method according to Structure (3) wherein there is further estimated whether an area irradiated by both of environment light and flashlight is present in the image or not, based on information about an object distance in the course of photographing.

Structure (5)

An image processing method conducting image processing on image signals indicating images obtained through photographing by a photographing apparatus and generating image signals for output use, wherein there are included a mixed area estimating process that estimates whether an area irradiated by both of environment light and flashlight is present in the image or not, based on information about environment light in the course of photographing and information about flashlight in the course of photographing, a mixed ratio estimating process that estimates a mixed ratio of flashlight in the course of photographing to environment light in the course of photographing, based on at least one of information about zoom magnification in the course of photographing and information about ISO speed, and a determining process that determines contents of the image processing based on the mixed ratio of flashlight in the course of photographing to environment light in the course of photographing estimated in the mixed ratio estimating process.

Structure (6)

The image processing method according to Structure (5) wherein there is further estimated whether an area irradiated by both of environment light and flashlight is present in the image or not, based on information about an object distance in the course of photographing in the mixed area estimating process.

Structure (7)

An image processing method conducting image processing on image signals indicating images obtained through photographing by a photographing apparatus and generating image signals for output use, wherein there are included a mixed area estimating process that estimates whether an area irradiated by both of environment light and flashlight is present in the image or not, based on information about environment light in the course of photographing and information about flashlight in the course of photographing, a mixed ratio estimating process that estimates a mixed ratio of flashlight in the course of photographing to environment light in the course of photographing, based on at least one of information about zoom magnification in the course of photographing and information about ISO speed, a detecting process that detects an area having the mixed ratio equivalent to or more than a prescribed value estimated in the mixed ratio estimating process, and a determining process that determines contents of the image processing based on the results of the detection in the detecting process.

Structure (8)

The image processing method according to Structure (7) wherein there is further estimated whether an area irradiated by both of environment light and flashlight is present in the image or not, based on information about an object distance in the course of photographing.

Structure (9)

The image processing method according to either one of Structures (5)–(8) wherein there is further estimated the mixed ratio of the environment light and flashlight based on information about environment light in the course of photographing, information about flash light in the course of photographing and information about an object distance, in the mixed ratio estimating process.

Structure (10)

The image processing method according to Structure (9) wherein there is estimated the mixed ratio of the environment light and flashlight, based on information of return of flashlight included in information about flashlight, in the mixed ratio estimating process.

Structure (11)

The image processing method according to Structure (7) or Structure (8) wherein there is detected an area where the mixed ratio has a value that is not less than a prescribed value, based on at least one of information about a subject area and information about a position of a subject, in the detecting process.

Structure (12)

The image processing method according to either one of Structures (7)–(11) wherein there are determined contents of image processing in accordance with hue information of the area detected in the detecting process in, in the determining process.

Structure (13)

The image processing method according to either one of Structures (7)–(12) wherein there is further included a judging process that judges whether a flesh color is included in an area detected in the detecting process, and contents of image processing are determined in accordance with the result of judgment in the judging process, in the determining process.

Structure (14)

An image processing method conducting image processing on image signals indicating images obtained through photographing by a photographing apparatus and generating image signals for output use, wherein there is included a determining process that determines contents of image processing conducted on the image signals, based on information about environment light in the course of photographing, information about flashlight in the course of photographing and at least one of information about a subject area and information about a subject position.

Structure (15)

The image processing method according to Structure (14) wherein contents of image processing conducted on the image signals are further determined based on information about an object distance in the course of photographing, in the determining process.

Structure (16)

An image processing method conducting image processing on image signals indicating images obtained through photographing by a photographing apparatus and generating image signals for output use, wherein there are included a mixed area estimating process that estimates whether an area irradiated by both of environment light and flashlight is present in the image or not, based on information about environment light in the course of photographing and information about flashlight in the course of photographing, and a determining process that determines contents of the image processing based on at least one of information about a subject area and information about a subject position and on the result of the estimation in the mixed area estimating process.

Structure (17)

The image processing method according to Structure (16) wherein there is further estimated whether an area irradiated by both of environment light and flashlight is present in the image or not, based on information about an object distance in the course of photographing, in the mixed area estimating process.

Structure (18)

An image processing method conducting image processing on image signals indicating images obtained through photographing by a photographing apparatus and generating image signals for output use, wherein there are included a mixed area estimating process that estimates whether an area irradiated by both of environment light and flashlight is present in the image or not, based on information about environment light in the course of photographing and information about flashlight in the course of photographing, a detecting process that detects an area including a principal subject irradiated by flashlight, based on at least one of information about a subject area and information about a subject position and a determining process that determines contents of the image processing based on the result of the detection in the detecting process.

Structure (19)

The image processing method according to Structure (18) wherein there is further estimated whether an area irradiated by both of environment light and flashlight is present in the image or not, based on information about an object distance in the course of photographing, in the mixed area estimating process.

Structure (20)

The image processing method according to Structure (18) wherein there is further determined contents of image processing based on information about photographing scene, in the determining process.

Structure (21)

The image processing method according to either one of Structures (14)–(20) wherein contents of image processing are determined in accordance with hue information of an area where a principal subject irradiated by flashlight is included, in the determining process.

Structure (22)

The image processing method according to either one of Structures (14)–(21) wherein there is further included a judging process that judges whether or not a flesh color is included in an area where a principal subject irradiated by the flashlight is included, and contents of image processing are determined based on the result of judgment in the judging process.

Structure (23)

The image processing method according to either one of Structures (1)–(22) wherein the image processing includes at least one processing out of contrast correction, color balance correction, hue correction, chroma correction, lightness correction, elimination of granulated noise and enhancement of sharpness.

Structure (24)

The image processing method according to either one of Structures (1)–(22) wherein there is adjusted a degree of at least one processing out of contrast correction, color balance correction, hue correction, chroma correction, lightness correction, elimination of granulated noise and enhancement of sharpness.

Structure (25)

The image processing method according to either one of Structures (1)–(22) wherein there is further included a correction process that conducts color correction so that a flesh color area may show a prescribed flesh color when the flesh color area is included in the image.

Structure (26)

An image processing apparatus conducting image processing on image signals indicating images obtained through photographing by a photographing apparatus and generating image signals for output use, wherein there is provided a determining means (section) that determines contents of image processing that is conducted on the image signals based on information about environment light in the course of photographing, information of flashlight in the course of photographing and at least one of information about zoom magnification in the course of photographing and information about ISO speed.

Structure (27)

The image processing apparatus according to Structure (26) wherein the determining means (section) further determines contents of image processing that is conducted on the image signals, based on information about an object distance in the course of photographing.

Structure (28)

An image processing apparatus conducting image processing on image signals indicating images obtained through photographing by a photographing apparatus and generating image signals for output use, wherein there are provided a mixed area estimating means (section) that estimates whether an area irradiated by both of environment light and flashlight is present in the image or not based on information about environment light in the course of photographing and information about flashlight in the course of photographing and a determining means (section) that determines contents of the image processing based on at least one of information about zoom magnification in the course of photographing and information about ISO speed and on the result of the estimation by the mixed area estimating means (section).

Structure (29)

The image processing apparatus according to Structure (28) wherein the mixed area estimating means (section) further estimates whether an area irradiated by both of environment light and flashlight is present in the image or not based on information about an object distance in the course of photographing.

Structure (30)

An image processing apparatus conducting image processing on image signals indicating images obtained through photographing by a photographing apparatus and generating image signals for output use, wherein there are provided a mixed area estimating means (section) that estimates whether an area irradiated by both of environment light and flashlight is present in the image or not based on information about environment light in the course of photographing and information about flashlight in the course of photographing, a mixed ratio estimating means (section) that estimates a mixed ratio of environment light in the course of photographing and flashlight based on at least one of information about zoom magnification in the course of photographing and information about ISO speed, and a determining means (section) that determines contents of the image processing based on the mixed ratio of the environment light in the course of photographing and flashlight estimated by the mixed ratio estimating means (section).

Structure (31)

The image processing apparatus according to Structure (30) wherein there is further estimated whether an area irradiated by both of environment light and flashlight is present in the image or not, based on information about an object distance in the course of photographing, in the mixed area estimating means (section).

Structure (32)

An image processing apparatus conducting image processing on image signals indicating images obtained through photographing by a photographing apparatus and generating image signals for output use, wherein there are provided a mixed area estimating means (section) that estimates whether an area irradiated by both of environment light and flashlight is present in the image or not based on information about environment light in the course of photographing and information about flashlight in the course of photographing, a mixed ratio estimating means (section) that estimates a mixed ratio of environment light in the course of photographing and flashlight based on at least one of information about zoom magnification in the course of photographing and information about ISO speed, a detecting means (section) that detects an area where the mixed ratio estimated by the mixed ratio estimating means (section) has a value that is not less than the prescribed value, and a determining means (section) that determines contents of the image processing based on the results of the detection in the detecting means (section).

Structure (33)

The image processing apparatus according to Structure (32) wherein there is further estimated whether an area irradiated by both of environment light and flashlight is present in the image or not, based on information about an object distance in the course of photographing, in the mixed area estimating means (section).

Structure (34)

The image processing apparatus according to either one of Structures (30)–(33) wherein there is further estimated a mixed ratio of the environment light and flashlight based on information about environment light in the course of photographing, information about flashlight in the course of photographing and information about an object distance, in the mixed ratio estimating means (section).

Structure (35)

The image processing apparatus according to Structure (34) wherein there is estimated a mixed ratio of the environment light and flashlight based on information about environment light in the course of photographing, information about flashlight in the course of photographing and information about an object distance, in the mixed ratio estimating means (section).

Structure (36)

The image processing apparatus according to Structures (32) or (33) wherein there is detected an area where the mixed ratio is not less than a prescribed value, based on at least one of information about a subject area and information about a subject position, in the detecting means (section).

Structure (37)

The image processing apparatus according to either one of Structures (32)–(36) wherein contents of image processing are determined in accordance with hue information of an area detected by the detecting means (section), in the determining means (section).

Structure (38)

The image processing apparatus according to either one of Structures (32)–(37) wherein there is further included a judging means (section) that judges whether a flesh color is included in the area detected by the detecting means (section) or not, and the determining means (section) determines contents of image processing in accordance with the results of judgment in the judging means (section).

Structure (39)

An image processing apparatus conducting image processing on image signals indicating images obtained through photographing by a photographing apparatus and generating image signals for output use, wherein there is provided a determining means (section) that determines contents of image processing conducted on the image signals, based on information about environment light in the course of photographing, information about flashlight in the course of photographing and at least one of information about a subject area and information about a subject position.

Structure (40)

The image processing apparatus according to Structure (39) wherein the determining means (section) further determines contents of image processing conducted on the image signals based on information about a subject distance in the course of photographing.

Structure (41)

An image processing apparatus conducting image processing on image signals indicating images obtained through photographing by a photographing apparatus and generating image signals for output use, wherein there are provided a mixed area estimating means (section) that estimates whether an area irradiated by both of environment light and flashlight is present in the image or not, based on information about environment light in the course of photographing and information about flashlight in the course of photographing and a determining means (section) that determines contents of image processing based on at least one of information about a subject area and information about a subject position and on the results of the estimation conducted by the mixed area estimating means (section).

Structure (42)

The image processing apparatus according to Structure (41) wherein the mixed area estimating means (section) further estimates whether an area irradiated by both of environment light and flashlight is present in the image or not, based on information about a subject distance in the course of photographing.

Structure (43)

An image processing apparatus conducting image processing on image signals indicating images obtained through photographing by a photographing apparatus and generating image signals for output use, wherein there are provided a mixed area estimating means (section) that estimates whether an area irradiated by both of environment light and flashlight is present in the image or not based on information about environment light in the course of photographing and information about flashlight in the course of photographing, a detecting means (section) that detects an area in which a principal subject irradiated by flashlight is included, based on at least one of information about a subject area and information about a subject position, and a determining means (section) that determines contents of image processing based on the results of the detection by the detecting means (section).

Structure (44)

The image processing apparatus according to Structure (43) wherein there is further estimated whether an area irradiated by both of environment light and flashlight is present in the image or not, based on information about a subject distance in the course of photographing, in the mixed area estimating means (section).

Structure (45)

The image processing apparatus according to Structure (43) wherein there is further determined contents of image processing based on information about photographing scene, in the determining means (section).

Structure (46)

The image processing apparatus according to either one of Structures (39)–(45) wherein contents of image processing are determined in accordance with hue information of an area in which a principal subject irradiated by flashlight is included, in the determining means (section).

Structure (47)

The image processing apparatus according to either one of Structures (39)–(46) wherein there is further provided a judging means (section) that judges whether or not a flesh color is included in an area in which a principal subject irradiated by flashlight is included, and contents of image processing are determined based on the results of the judgment by the judging means (section), in the determining means (section).

Structure (48)

The image processing apparatus according to either one of Structures (26)–(47) wherein the image processing includes at least one processing out of contrast correction, color balance correction, hue correction, chroma correction, lightness correction, elimination of granulated noise and enhancement of sharpness.

Structure (49)

The image processing apparatus according to either one of Structures (26)–(47) wherein a degree of at least one processing among contrast correction, color balance correction, hue correction, chroma correction, lightness correction, elimination of granulated noise and enhancement of sharpness is adjusted based on information about environment light in the course of photographing and information about flashlight in the course of photographing.

Structure (50)

The image processing apparatus according to either one of Structures (26)–(47) wherein there is further provided a correcting means (section) that conducts color correction so that a flesh color area may show a prescribed flesh color, when a flesh color area is included in the image.

Structure (51)

An image recording apparatus conducting image processing on image signals indicating images obtained through photographing by a photographing apparatus and recording image signals for output use, wherein there is provided a determining means (section) that determines contents of image processing that is conducted on the image signals, based on information about environment light in the course of photographing, information about flashlight in the course of photographing and on at least one of information about zoom magnification in the course of photographing and information about ISO speed.

Structure (52)

The image recording apparatus according to Structure (51) wherein the determining means (section) further determines contents of image processing that is conducted on the image signals, based on information about a subject distance in the course of photographing.

Structure (53)

An image recording apparatus conducting image processing on image signals indicating images obtained through photographing by a photographing apparatus and recording image signals for output use, wherein there are provided a mixed area estimating means (section) that estimates whether an area irradiated by both of environment light and flashlight is present in the image or not based on information about environment light in the course of photographing and information about flashlight in the course of photographing, and a determining means (section) that determines contents of the image processing based on at least one of information about zoom magnification in the course of photographing and information about ISO speed and on the results of the estimation by the mixed area estimating means (section).

Structure (54)

The image recording apparatus according to Structure (53) wherein the mixed area estimating means (section)

further estimates whether an area irradiated by both of environment light and flashlight is present in the image or not, based on information about a subject distance in the course of photographing.

Structure (55)

An image recording apparatus conducting image processing on image signals indicating images obtained through photographing by a photographing apparatus and recording image signals for output use, wherein there are provided a mixed area estimating means (section) that estimates whether an area irradiated by both of environment light and flashlight is present in the image or not based on information about environment light in the course of photographing and information about flashlight in the course of photographing, a mixed ratio estimating means (section) that estimates a mixed ratio of environment light in the course of photographing and flashlight based on at least one of information about zoom magnification in the course of photographing and information about ISO speed, and a determining means (section) that determines contents of the image processing based on the mixed ratio. of the environment light and flashlight both in the course of photographing, estimated by the mixed ratio estimating means (section).

Structure (56)

The image recording apparatus according to Structure (55) wherein the mixed area estimating means (section) further estimates whether an area irradiated by both of environment light and flashlight is present in the image or not, based on information about a subject distance in the course of photographing.

Structure (57)

An image recording apparatus conducting image processing on image signals indicating images obtained through photographing by a photographing apparatus and recording image signals for output use, wherein there are provided a mixed area estimating means (section) that estimates whether an area irradiated by both of environment light and flashlight is present in the image or not based on information about environment light in the course of photographing and information about flashlight in the course of photographing, a mixed ratio estimating means (section) that estimates a mixed ratio of environment light in the course of photographing and flashlight based on at least one of information about zoom magnification in the course of photographing and information about ISO speed, a detecting means (section) that detects an area where the mixed ratio estimated by the mixed ratio estimating means (section) has a value that is not less than a prescribed value, and a determining means (section) that determines contents of the image processing based on the results of the detection in the detecting means (section).

Structure (58)

The image recording apparatus according to Structure (57) wherein the mixed area estimating means (section) further estimates whether an area irradiated by both of environment light and flashlight is present in the image or not based on information about a subject distance in the course of photographing.

Structure (59)

The image recording apparatus according to either one of Structures (55)–(58) wherein the mixed ratio estimating means (section) further estimates the mixed ratio of the environment light and flashlight, based on information about environment light in the course of photographing, information about flashlight in the course of photographing and information about a subject distance.

Structure (60)

The image recording apparatus according to Structure (59) wherein the mixed ratio estimating means (section) estimates the mixed ratio of environment light and flashlight based on return information of flash light included in information about flash light.

Structure (61)

The image recording apparatus according to Structure (57) or (58) wherein the detecting means (section) detects an area where the mixed ratio has a value that is not less than a prescribed value, based on at least one of information about a subject area and information about a subject position.

Structure (62)

The image recording apparatus according to either one of Structures (57)–(61) wherein the determining means (section) determines contents of image processing in accordance with hue information of an area detected by the detecting means (section).

Structure (63)

The image recording apparatus according to either one of Structures (57)–(62) wherein there is further provided a judging means (section) that judges whether a flesh color is included in an area detected by the detecting means (section), and the determining means (section) determines contents of image processing in accordance with the result of the judgment in the judging means (section).

Structure (64)

An image recording apparatus conducting image processing on image signals indicating images obtained through photographing by a photographing apparatus and recording image signals for output use, wherein there is provided a determining means (section) that determines contents of image processing conducted on the image signals, based on information about environment light in the coursed of photographing, information about flashlight in the coursed of photographing and on at least one of information about a subject area and information about a subject position.

Structure (65)

The image recording apparatus according to Structure (64) wherein the determining means (section) further determines contents of image processing conducted on the image signals, based on information about a subject distance in the course of photographing.

Structure (66)

An image recording apparatus conducting image processing on image signals indicating images obtained through photographing by a photographing apparatus and recording image signals for output use, wherein there are provided a mixed area estimating means (section) that estimates whether an area irradiated by both of environment light and flashlight is present in the image or not based on information about environment light in the course of photographing and information about flashlight in the course of photographing, and a determining means (section) that determines contents of the image processing based on at least one of information about a subject area and information of a subject position and on the result of estimation by the mixed area estimating means (section).

Structure (67)

The image recording apparatus according to Structure (66) wherein the mixed area estimating means (section) further estimates whether an area irradiated by both of environment light and flashlight is present in the image or not, based on information about a subject distance in the course of photographing.

Structure (68)

An image recording apparatus conducting image processing on image signals indicating images obtained through photographing by a photographing apparatus and recording image signals for output use, wherein there are provided a mixed area estimating means (section) that estimates whether an area irradiated by both of environment light and flashlight is present in the image or not based on information about environment light in the course of photographing and information about flashlight in the course of photographing, and a detecting means (section) that detects an area in which a principal subject irradiated by flashlight is included based on at least one of information about a subject area and information of a subject position, and a determining means (section) that determines contents of image processing based on the results of the detection by the detecting means (section).

Structure (69)

The image recording apparatus according to Structure (68) wherein the mixed area estimating means (section) further estimates whether an area irradiated by both of environment light and flashlight is present in the image or not, based on information about a subject distance in the course of photographing.

Structure (70)

The image recording apparatus according to Structure (68) wherein the determining means (section) further determines contents of image processing based on information about photographing scene.

Structure (71)

The image recording apparatus according to either one of Structures (64)–(70) wherein the determining means (section) determines contents of image processing based on hue information of an area in which a principal subject irradiated by flashlight is included.

Structure (72)

The image recording apparatus according to either one of Structures (64)–(71) wherein there is further provided a judging means (section) that judges whether or not a flesh color is included in an area in which a principal subject irradiated by the flashlight is included, and the determining means (section) determines contents of image processing based on the results of the judgment by the judging means (section).

Structure (73)

The image recording apparatus according to either one of Structures (51)–(72) wherein the image processing includes at least one processing out of contrast correction, color balance correction, hue correction, chroma correction, lightness correction, elimination of granulated noise and enhancement of sharpness.

Structure (74)

The image recording apparatus according to either one of Structures (51)–(72) wherein the degree of at least one processing out of contrast correction, color balance correction, hue correction, chroma correction, lightness correction, elimination of granulated noise and enhancement of sharpness, is adjusted, based on information about environment light in the course of photographing and on information about flashlight.

Structure (75)

The image recording apparatus according to either one of Structures (51)–(72) wherein there is further provided a correcting means (section) that conducts color correction so that the flesh color area may show a prescribed flesh color when a flesh color area is included in the imaged.

Structure (76)

The image recording apparatus according to either one of Structures (51)–(75) wherein there is further provided a recording means (section) that records image signals for output use on a recording medium, and the recording means (section) prints the image signals on a printing medium for outputting.

Structure (77)

The image recording apparatus according to either one of Structures (51)–(75) wherein there is further provided a recording means (section) that records image signals for output use on a recording medium, and the recording means (section) records the image signals on a silver halide type photographic paper.

Structure (78)

The image recording apparatus according to either one of Structures (51)–(75) wherein there is further provided a recording means (section) that records the image signals for output use on a recording medium, and the recording means (section) prints the image signals on a printing medium through an ink jet method for printing.

Structure (79)

The image recording apparatus according to either one of Structures (51)–(75) wherein there is further provided a recording means (section) that records the image signals for output use on a recording medium, and the recording means (section) prints the image signals on a printing medium through an electrophotographic method.

Structure (80)

The image recording apparatus according to either one of Structures (51)–(75) wherein there is further provided a recording means (section) that records the image signals for output use on a recording medium, and the recording means (section) prints the image signals on a printing medium through a sublimation method.

Structure (81)

The image recording apparatus according to either one of Structures (51)–(75) wherein there is further provided a recording means (section) that records the image signals for output use on a recording medium, and the recording means (section) prints the image signals on a printing medium through a thermal method.

Structure (82)

The image recording apparatus according to either one of Structures (51)–(75) wherein there is further provided a recording means (section) that records the image signals for output use on a recording medium, and the recording means (section) records the image signals on a recording medium as digital data.

Structure (83)

The image recording apparatus according to Structure (82) wherein the recording medium is at least one of CD-R, CD-RW, MD, a memory card, an IC card, a flexible disk and a magneto-optical disk.

DESCRIPTION OF THE PREFERRED EMBODIMENT

Figure 1:
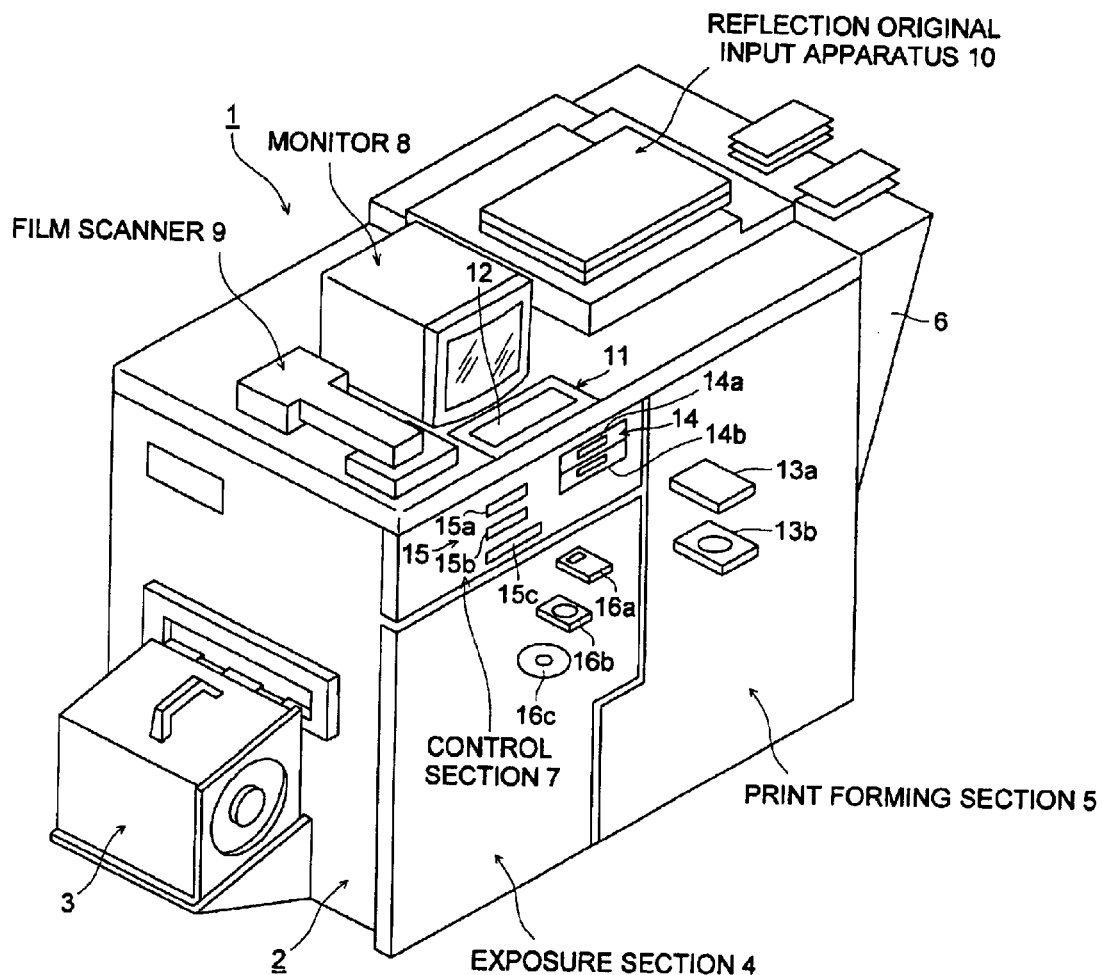
FIG. 1 is a perspective view showing an embodiment of image recording apparatus 1.

An embodiment of image recording apparatus 1 to which the invention is applied will be explained in detail as follows, referring to the drawings. Though an apparatus wherein a light-sensitive material is exposed and developed to form a print is explained in this case, the invention is not limited to this, and it has only to be an apparatus that can form a print based on image signals (which are called image data in the present embodiment). For example, the invention may also employ a print forming apparatus of an ink jet type, an electrophotographic type, a thermal type or a sublimation type.

First the structure will be explained.

FIG. 1 is a perspective view showing an embodiment of image recording apparatus 1.

In FIG. 1, image recording apparatus 1 is provided with magazine loading section 3 on the left side of main body 2, and is provided with exposure processing section 4 that exposes a light-sensitive material representing a recording medium and with print forming section 5 that develops the exposed light-sensitive material and dries it to form, inside the main body 2, and a print thus formed is ejected to tray 6 provided on the right side of the main body 2. Further, inside the main body 2, control section 7 is provided at the upper position of the exposure processing section 4.

Further, on the top of the main body 2, there is arranged monitor 8. The monitor 8. constitutes a display means that displays, on the screen, the images based on image data from which a print is to be formed. Further, on the left side of the monitor 8, there is arranged film scanner 9, and on the right side thereof, there is arranged reflection original input apparatus 10.

Further, operation section 11 is arranged on the front side of the monitor 8, and information input means 12 is further provided on the operation section 11. This information input means 12 is constituted with, for example, a touch panel.

In the vicinity of the control section on the main body 7, there is provided image reading section 14. On the image reading section 14, there are provided PC card use adaptor 14a and flexible disk use adaptor 14b, and PC card 13a and flexible disk 13b are structured to be capable of being mounted on and dismounted from the image reading section 14. Image data corresponding to plural images obtained through photographing by, for example, a digital camera are stored in a memory provided inside the PC card 13a. Image data corresponding to plural images obtained through photographing by, for example, a digital camera are stored in the flexible disk 13b. In addition to the foregoing, it is also possible to arrange so that recording media such as a memory card, MD data and CD-ROM are structured to be capable of being mounted on or dismounted from the main body 2, and image data stored in these recording media are acquired.

Further, image writing section 15 is provided in the vicinity of the control section 7. On the image writing section 15, there are provided flexible disk use adaptor 15a, magneto-optical disk use adaptor 15b and optical disk use adaptor 15c, and flexible disk 16a, magneto-optical disk 16b and optical disk 16c are structured detachably so that image data may be written on each of disks 16a - 16c.

Incidentally, though operation section 11, monitor 8, film scanner 9, reflection original input apparatus 10, image reading section 14 and image writing section 15 are structured to be solidly with the main body 2 in FIG. 1, the invention is not limited to this, and either one of them can be provided separately.

Figure 2:
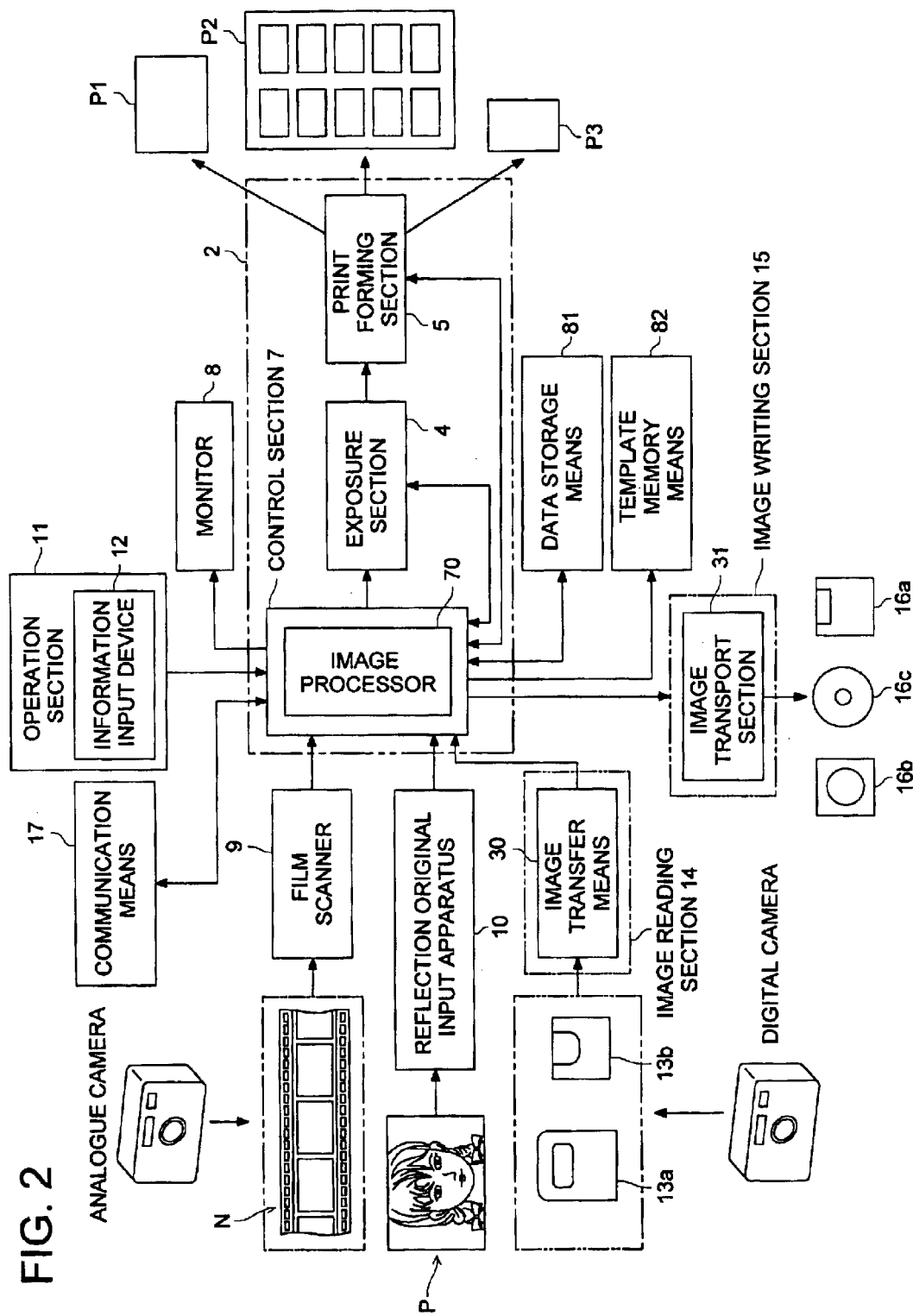
FIG. 2 is a schematic structure diagram in image recording apparatus 1.

FIG. 2 is a schematic structure diagram in image recording apparatus 1.

In FIG. 2, control section 7 is composed of CPU (Central Processing Unit) and a storage section. CPU reads various types of control programs stored in the storage section, and controls centrally operations of each section constituting the image recording apparatus 1 in accordance with control programs. Further CPU conducts image output processing described later, in accordance with the control program thus read out.

The control section 7 has image processor 70 where various types of processes are conducted. To explain in detail, in the image processor 70, original images (for example, negative film N, print P, PC card 13a, flexible disk 13b and others) are read by film scanner 9, reflection original input apparatus 10 or by image transfer means 30 of image reading section 14, based on input signals coming from information input means 12 of operation section 11, and image data corresponding to the original images thus read are stored in data storage means 81. Incidentally, tag information described later is added to the image data which are read in this case. Further, in this case, the image processor 70 stores in data storage means 81 the order information (for example, print quantity, print sizes and others) inputted from information input means 12 of operation section 11.

Further, the image processor 70 conducts image processing on image data stored in data storage means 81, image data which are read from image reading section 14 and image data inputted from outer equipment through communication means 17.

Further, if composition of image data by a template is instructed by information input means 12 of operation section 11, the image processor 70 further makes a template used by information input means 12 and sample image data to be selected, and extracts them from template storage means 82. Then, the extracted sample image data, image data, image data and character data specified by information input means 12 of operation section 11 are composed by the extracted template. The composition by the template is conducted by, for example, a known chromakey method.

Further, the image processor 70 conducts conversion processing in accordance with an outputting mode for image data which have been subjected to image processing, and outputs them by monitor 8, exposure processing section 4, image transport section 31, communication means 17 or an external printer.

Operation section 11 has therein information input means 12 which is composed of a touch panel, for example, and outputs press-down signals of the information input means 12 to control section 7 as input signals. Further, the operation section 11 may also be composed of a key board and a mouse as information input means 12.

Film scanner 9 reads image data out of developed negative film obtained by developing a negative film obtained through photographing by an analog camera, and outputs them to control section 7.

Reflection original input apparatus 10 is, for example, a flat-bed scanner which reads image data out of print P that is obtained by printing images on a photographic paper and by developing it, to convert them into digital image data, and outputs them to control section 7.

Image reading section 14 has therein image transfer means 30, and reads image data from PC card 13a or flexible disk 13b storing therein image data based on images obtained through photographing by a digital camera, to transfer them to control section 7. Incidentally, there are provided PC card use adaptor 14a and flexible disk use adaptor 14b, as image transfer means 30.

Exposure processing section 4 exposes a light-sensitive material to light in accordance with image data outputted from the image processor 70 of control section 7, and outputs it to print forming section 5.

The print forming section 5 develops a light-sensitive material exposed to light by the exposure processing section 4, and it further dries it to form prints P1, P2 and P3. For example, print P1 represents prints in a service size, a HDTV size and a panoramic size, print P2 represents a print in A4 size and print P3 represents a print in a card size.

Incidentally, an image developed in the print forming section 5 is printed and outputted, for example, on a silver halide photographic paper to become a print.

Further, as a light-sensitive material processed in the exposure processing section 4 and the print forming section 5, there are given a color negative film, a color reversal film, a black and white negative film and a black and white reversal film, in addition to a color photographic paper and a black and white photographic paper.

Image writing section 15 has image transport section 31, and transports image data to an image recording medium such as mounted flexible disk 16a, magneto-optical disk 16b or optical disk 16c, to write them in. Incidentally, as the image transport section 31, there are provided flexible disk use adaptor 15a, magneto-optical disk use adaptor 15b and optical disk use adaptor 15c.

Data storage means 81 stores image data and order information (for example, print quantity and print sizes) so that both of them may correspond each other.

Incidentally, the data storage means 81 stores also tag information added to image data. This tag information is one storing various pieces of information for images obtained through photographing, and in the present embodiment, existing tag information stipulated in various types of general purpose image formats represented by JPEG, TIFF and Exif are used. However, the invention is not limited to this, and information established in the area that can be used freely such as a maker note and a user note, for example, may also be used. It is also possible to use various types of information inputted from information input means 12 of operation section 11, and tag information may be acquired, in this case, as independent information.

Further, tag information for images which are read by film scanner 9 or reflection original input apparatus 10 may be recorded, optically or magnetically, on a light-sensitive material such as a negative film, in the course of photographing or before developing, so that various types of information corresponding to tag information may be acquired in the course of reading.

Further, various functions such as light quantity measuring functions accompanying a photographing apparatus such as a camera may also be used. In the case of a digital camera, for example, it is also possible to acquire information about environment light or flashlight by using a photometry means to be used for controlling automatic exposure and an image pick-up element. Or, it is also possible to measure environment light or flashlight by a spectrophotometer, and to acquire information about environment light or flashlight with measurement values.

Incidentally, when using a measuring function accompanying a photographing apparatus or a spectrophotometer, it is also possible to rewrite into tag information added to image indicating exposed images, as information about environment light or flashlight.

Further, as tag information, there are given, for example, information about environment light in the course of photographing, information about flashlight in the course of photographing, information about zoom magnification in the course of photographing, information about ISO speed and information about a subject distance in the course of photographing.

In this case, "information about environment light in the course of photographing" means a light source under which a subject is photographed in the course of photographing, and it concretely is information including a type of a light source (a fluorescent lamp, a tungsten lamp, sunlight (daylight)), a type of a light source accompanying a photographing apparatus (namely, flashlight), the weather (fine weather, cloudy weather, rainy weather, and snowy weather), color temperature and time (morning and evening).

Further, "information about flashlight in the course of photographing" means the state of flash emission function and a type of flash light under which flash photographing is conducted, and it concretely is information including a presence of flash light, detection of flash reflection light (return information), a mode of flash emission function (automatic emission mode, forced emission mode and forced non-emission mode), a presence of flash function of a photographing apparatus and flashlight intensity (for example, energy expressed by units of Beam, Candle and Power).

Further, "information about zoom magnification in the course of photographing" means a value of a zoom magnification in the course of photographing, and it may also be one concerning either one of functions of optical zooming and digital zooming. Incidentally, optical zooming is a method to change a field angle by changing a focal length between a film surface and a lens or between CCD (Charge Coupled Device) and a lens, while, digital zooming is one of functions owned by a digital camera, and it is a method to change a field angle by enlarging an image picked up at the central portion of CCD and by conducting interpolation processing.

Further, "information about ISO speed" means a ISO speed in accordance, for example, with a display definition stipulated in ISO 12232 in the digital camera (namely, values indicating sensitiveness and a permissible range to light), and it means a value of ISO speed described on a film package used in a silver halide type camera.

Further, "information about a subject distance in the course of photographing" is one indicating a distance from a photographing apparatus to a principal subject, and it may be either an expression such as close-range view, a distant view and close-up photography, or a concrete distance.

In template storage means 82, there are stored beforehand sample image data such as a background image and an illustration image as well as at least one template establishing an area for composition.

Monitor 8 is composed of CRT (Cathode Ray Tube) and a liquid crystal apparatus, and it conducts various types of displays based on image data inputted from control section 7.

Communication means 17 receives image data expressing images picked up and print orders from outer apparatuses (for example, computers in the same building and remote computers) which are connected by various types of line networks such as telephone circuit-network, ISDN line network, exclusive lines, mobile communication network, a communications satellite circuit and CATV line network, and by the communication network including the Internet service provider connecting the foregoing and a base station, or the communication means 17 transmits image data which have been subjected to image processing to the outer apparatuses.

Figure 3:
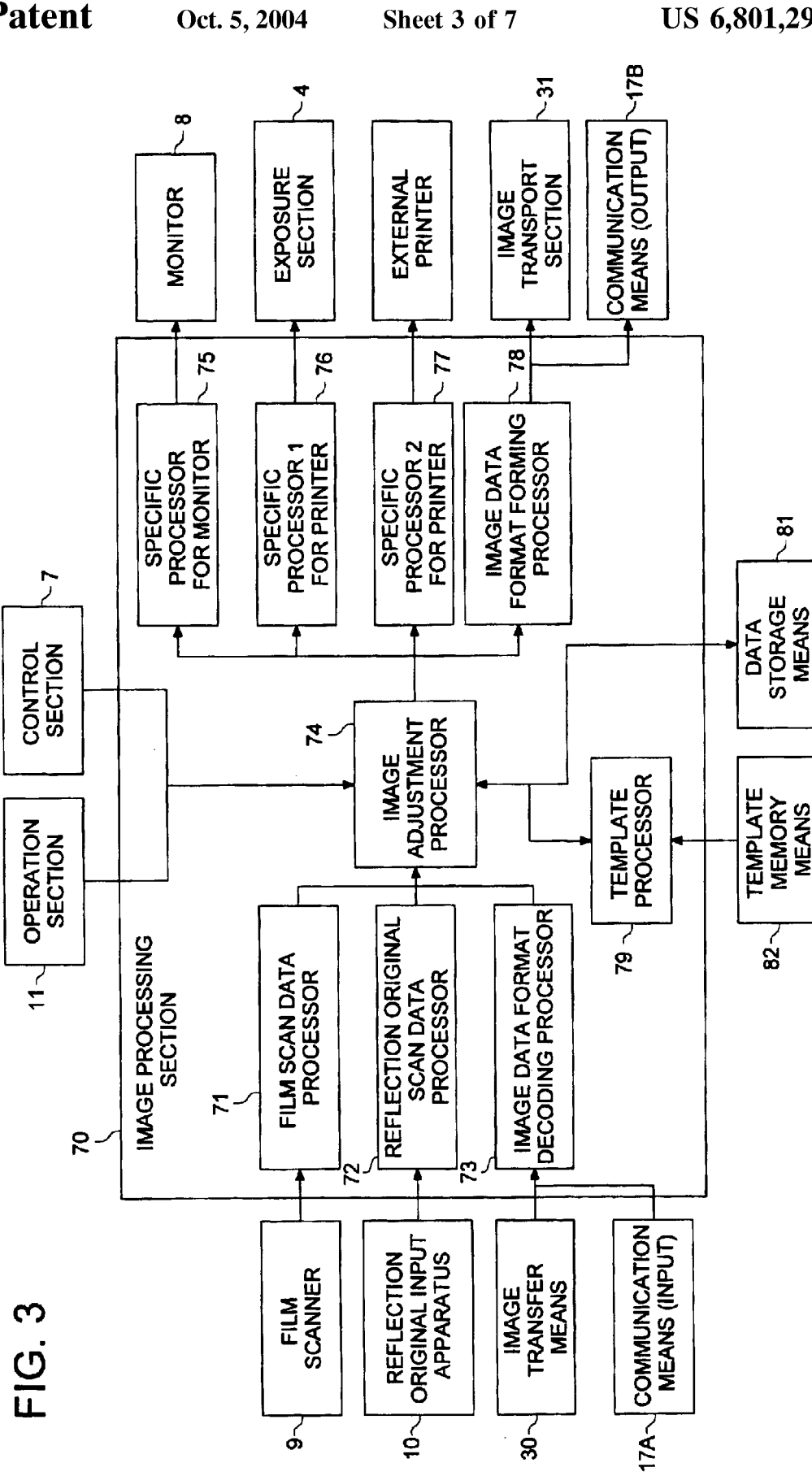
FIG. 3 is a diagram showing a schematic structure of image processor 70.

FIG. 3 is a diagram showing the schematic structure of image processor 70.

In film scan data processor 71, the image data inputted from film scanner 9 are subjected to specific proofing operation for film scanner 9, negative-positive reversal process for a negative original, removal of dust and scratches, gray balance adjustment (=white balance adjustment), contrast adjustment (correction), removal of granulated noise and sharpness enhancement, and are outputted to image adjustment processor 74. Further, film sizes, types of negative or positive, information about a principal subject recorded optically or magnetically on a film and photographing information about photographing conditions (for example, contents of described information of APS) are outputted together to the image adjustment processor 74.

In reflection original scan data processor 72, image data inputted from reflection original input apparatus 10 are subjected to specific proofing operation for the reflection original input apparatus 10, removal of dust and scratches, gray balance adjustment, contrast adjustment, removal of noise and sharpness enhancement, and are outputted to the image adjustment processor 74.

In image data format decoding processor 73, image data inputted from image transfer means 30 and communication means 17A are subjected to restoration of compression code and conversion of a method of expression for color signals in case of need, conforming to the data format of the image data, and are converted to the data form suitable for operation in image processor 70, to be outputted to the image adjustment processor 74. In addition, photographing information acquired from tag information of image data (information about environment light in the course of photographing, information about flashlight in the course of photographing, information about zoom magnification in the course of photographing, information about ISO speed and information about a subject distance in the course of photographing) are outputted to the image adjustment processor 74 together.

In addition to the foregoing, it is also possible to input the aforesaid information in the image adjustment processor 74 from the operation section in the form to supplement the aforementioned information (information about environment light in the course of photographing, information about flashlight in the course of photographing, information about zoom magnification in the course of photographing, information about ISO speed and information about a subject distance in the course of photographing) coming from film scanner 9, reflection original input apparatus 10, image transfer means 30 and communication means 17A.

Though the sizes of output images are determined based on the specification inputted from operation section 11, it is also possible, in addition to the foregoing, to determine the sizes based on the specification about sizes of output images received from communication means 17A or based on the specification about sizes of output images embedded in tag information of the image data which were obtained by image transfer means 30.

The image adjustment processor 74 outputs image data to template processor 79, when template processing is carried out. Then, in the template processor 79, image data which have been subjected to template processing are inputted in the image adjustment processor 74.

Further, the image adjustment processor 74 conducts image processing on image data inputted from film scanner 9, reflection original input apparatus 10, image transfer means 30, communication means 17A and template processor 79, conforming to the specification of operation section 11 or control section 7, so that images may give favorable impression when the images are observed on an output medium through the processing that will be explained later, And outputs the processed image data to specific processor for monitor 75, specific processor for printer 76, specific processor for printer 77, image data format forming processor 78 and data storage means 81.

Specific processor for monitor 75 conducts processing such as a change of the number of pixels and color matching on image data inputted from the image adjustment processor 74, in case of need, to output to monitor 8.

The specific processor for printer 76 conducts specific proofing processing for printer, color matching and a change of the number of pixels on image data inputted from the image adjustment processor 74, in case of need, and outputs the image data to exposure section 4.

The specific processor for printer 76 conducts specific proofing processing for printer, color matching and a change of the number of pixels on image data inputted from the image adjustment processor 74, in case of need, and outputs the image data to an outer printer.

The image data format forming processor 78 conducts conversion to general purpose image formats of various types represented by JPEG, TIFF and Exif on image data inputted from the image adjustment processor 74, in case of need, and outputs the image data to image transport section 31 and communication means 17B.

A division of each processing sections in the image processor 70 is one provided for easy understanding of functions of the image processor 70, and each division does not always need to be realized as an independent device, and it may also be realized, for example, as a division for types of software processing in a single CPU.

Next, operations will be explained as follows.

Figure 4:
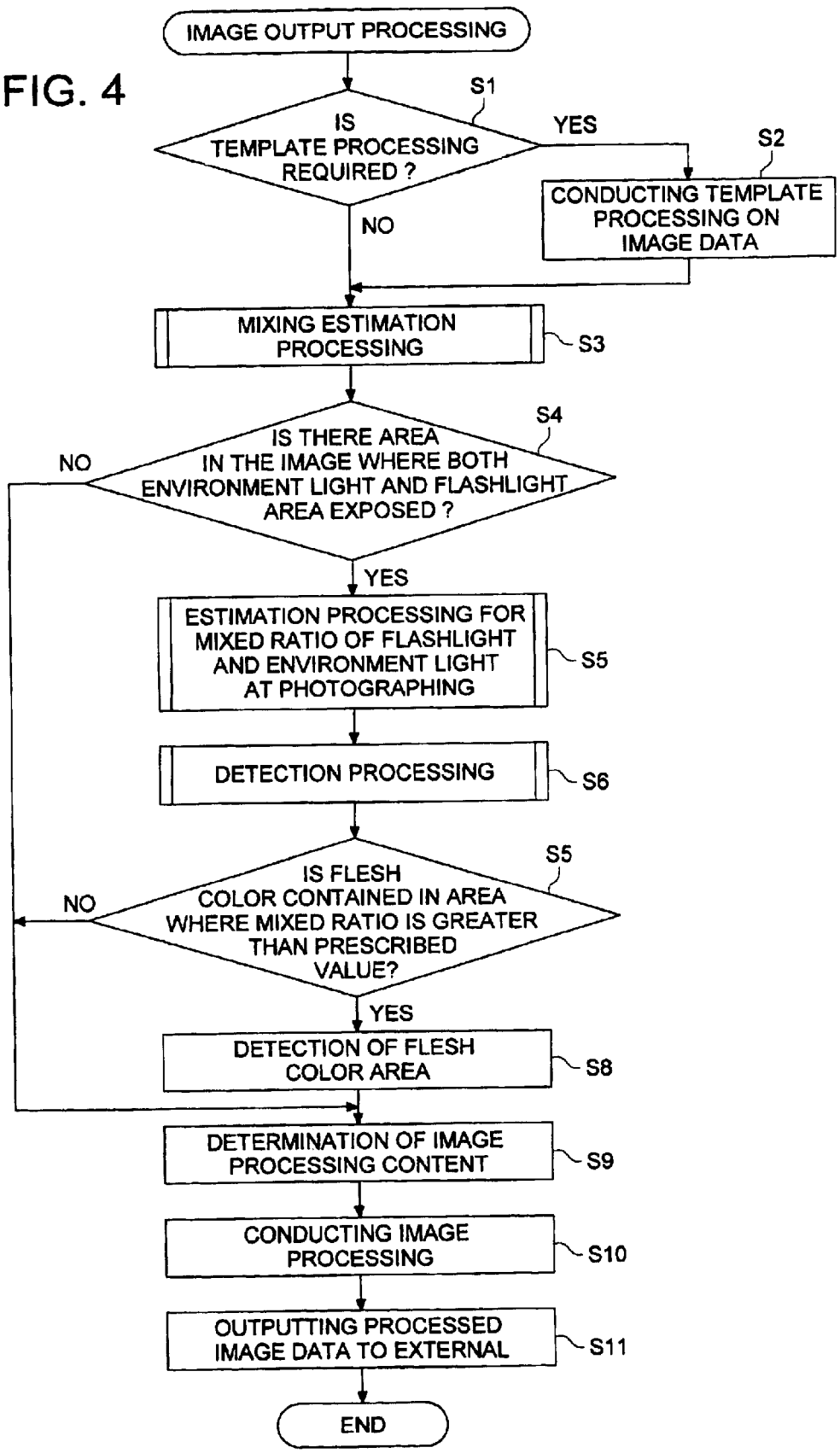
FIG. 4 is a flow chart showing a flow of image output processing.

FIG. 4 is a flow chart showing a flow of image output processing conducted by control section 7. Image output processing will be explained as follows, referring to FIG. 4.

First, when image reading is instructed by operation section 11, the control section 7 reads images by means of film scanner 9, reflection original input apparatus 10, image reading section 14 or communication means 17. Then, the control section 7 judges whether it is necessary to conduct template processing for the read image or not (step S 1).

In this case, when the instruction from operation section 11 makes the control section 7 to judge that it is necessary to conduct template processing on the read image (step S 1; YES), the control section 7 makes operation section 11 to specify sample image data and a template, and image data corresponding to the read image and the sample image data are compounded by the specified template. If composition of character data is further specified from operation section 11, the control section 7 conducts composition including the character data. After that, the control section 7 advances to the mixing estimation processing shown in FIG. 5 (step S 3).

Figure 5:
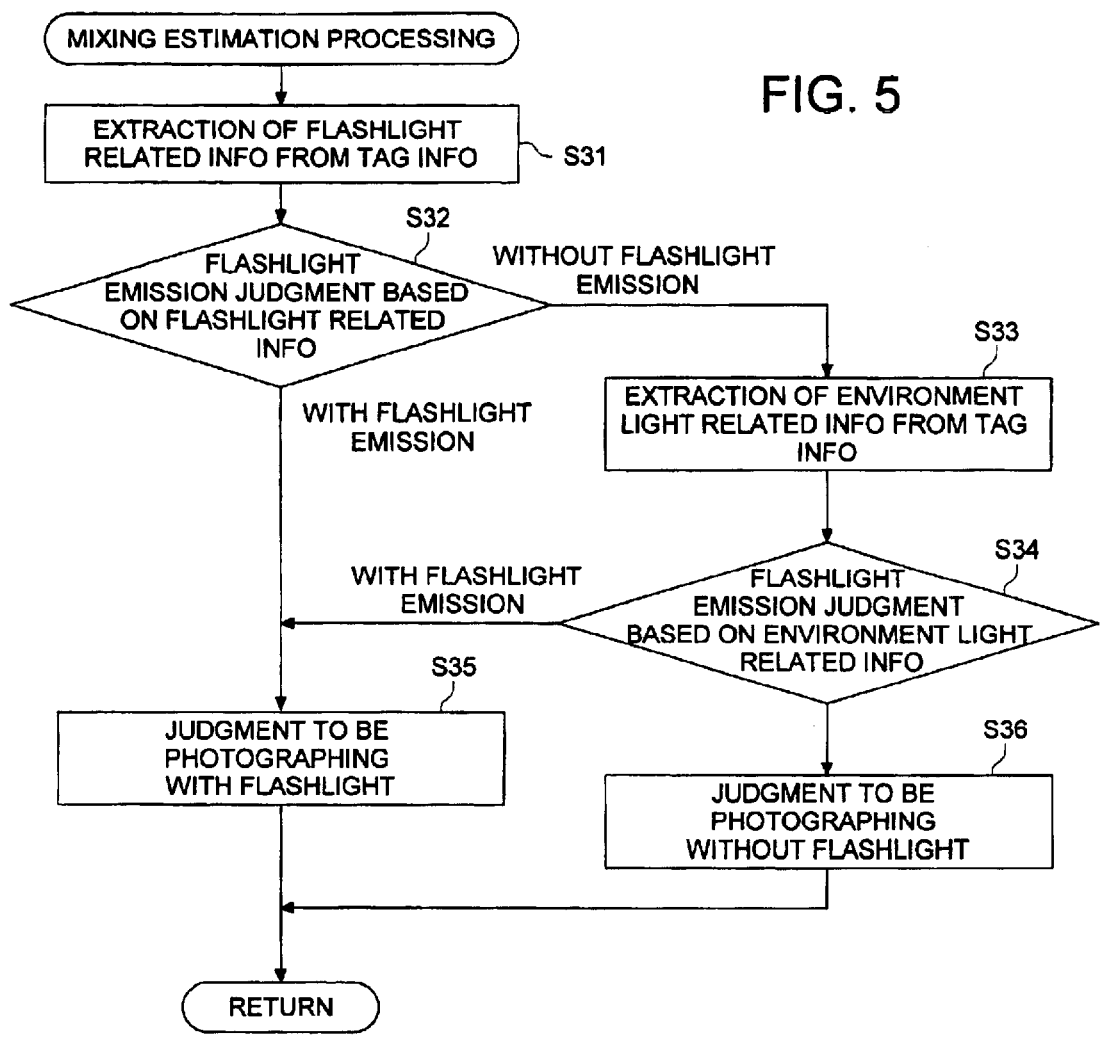
FIG. 5 is a flow chart showing a flow of mixing estimation processing.

FIG. 5 is a flow chart showing a flow of mixing estimation processing.

Control section 7 extracts "information about flashlight in the course of photographing" from tag information added to image data corresponding to images read by film scanner 9, reflection original input apparatus 10, image reading section 14 or communication means 17 (step S 31).

Then, the control section 7 judges a presence of flashlight based on "information about flashlight in the course of photographing" (S 32).

Occasions wherein flashlight emission is judged not to be present (S 32; without flashlight emission) are considered to be the following three occasions; (1) when photographing was conducted under a single light source of only environment light, (2) when a flashing function is not equipped on a photographing apparatus, and flash photographing was conducted by an independent electronic flash device, and (3) when a photographing apparatus is accompanied by a flashing function, and flashlight was emitted in the course of photographing, but the photographing apparatus was not equipped with a function to write "information about flashlight in the course of photographing" as tag information. For recognizing the aforesaid occasion (2) or (3) as flash photographing in the invention, "information about environment light in the course of photographing" is further extracted from tag information (S 33), and based on this "information about environment light in the course of photographing", the aforesaid occasion (2) or (3), namely, whether the flash photographing was conducted or not is judged (S 34).

In this case, if it is judged to be without flashlight emission (S 34; without flashlight emission), the control section 7 judges "not to be flash photographing" (S 36), and moves to step S 4 in FIG. 4.

While, when it is judged to be with flashlight emission in step S 34 (S 34; with flashlight emission), or when t is judged to be with flashlight emission in step S 32 (S 32; with flashlight emission), the control section 7 judges "to be flash photographing" (S 35), and moves to step S 4 in FIG. 4.

Next, the control section 7 judges, in step S 4 in FIG. 4, whether or not an area irradiated by both of environment light and flashlight is present in image data (step S 4). In this case, the control section 7 judges that an area irradiated by both of environment light and flashlight is not present (step S 4; NO) if it had judged "not to be flash photographing" in the aforesaid mixing estimation processing (FIG. 5), and moves to step D 9. Further, in this case, the control section 7 judges that an area irradiated by both of environment light and flashlight is present (step S 4; YES) if it had judged "to be flash photographing", and moves to the estimation processing to estimate the mixed ratio (step S 5).

Figure 6:
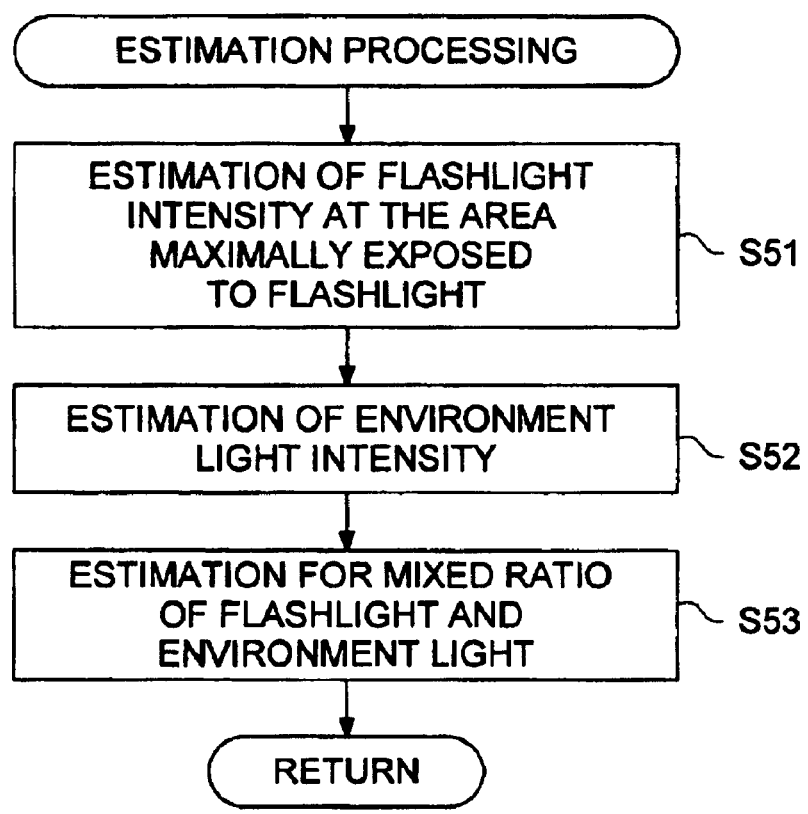
FIG. 6 is a flow chart showing a flow of estimation processing.

FIG. 6 is a flow chart showing a flow of estimation processing.

In FIG. 6, control section 7 extracts "information about flashlight in the course of photographing", "information about zoom magnification in the course of photographing" and "information about ISO speed" from tag information corresponding to image data, and estimates intensity of flashlight in an area that is irradiated by the most intensive flashlight (step S 51).

To be concrete, based on the subject distance estimated from intensity of flashlight and return information included in "information about flashlight in the coursed of photographing" and from zoom magnification obtained from "information about zoom magnification in the coursed of photographing", or on the subject distance obtained from "information about a subject distance in the coursed of photographing" acquired from tag information corresponding to image data, the intensity of flashlight radiated on a subject that is present in an area irradiated by flashlight having the highest intensity is estimated. Incidentally, to estimate "an area irradiated by flashlight having the highest intensity", information about "a subject area" and information about "a subject position" showing respectively the area and position of a principal subject in the image are acquired from, for example, tag information corresponding to image data, because flashlight is generally irradiated on a principal subject such as a person in many cases.

Incidentally, the reason for using the aforesaid method is as follows; a principal subject is irradiated with highest intensity by flashlight having the highest intensity in many cases, because flashlight is emitted toward the principal subject in many cases, and a distance between subjects existing in an area irradiated by a flashlight source with highest intensity and the flashlight can be approximately equal to a subject distance. Further, for estimating the intensity of flashlight by using a subject distance, the relationship (intensity<proportion>1/(second power of distance)) between a light source and a distance, which is widely known, can be used.

Incidentally, when information about intensity of flashlight cannot be obtained from "information about flashlight in the course of photographing", it is possible to acquire information about a maker name of an image input apparatus and a model name of an image input apparatus, a grade type (for example, grade types of an SLR camera, a compact camera and a lens-fitted film unit in the case of a camera using a film, and grade types of the number of pixels in the case of a digital camera) from tag information and operator input information separately, and to estimate intensity of flashlight used in photographing, by referring to the table prepared in advance.

Further, the intensity of flashlight radiated on a subject existing in an area irradiated by flashlight having the highest intensity is corrected from an ISO speed. LUT of ISO speed and a correction coefficient of intensity of flashlight is prepared in advance, and a correction coefficient is obtained from the ISO speed value, and the original value is multiplied by the obtained correction coefficient. In place of LUT, a prescribed definition expression may also be used.

In general, a silver halide type camera and a digital camera are accompanied by an automatic light emitting function that operates electronic flash function and radiates flashlight when an amount of light reflected from a subject is insufficient in photographing, and further, a silver halide type camera and a digital camera are accompanied by an automatic adjusting function that adjusts intensity of flashlight to be radiated, because a deficiency of an amount of light varies depending on ISO speed of a film or of a digital camera. Namely, even in the case where the same subject is photographed under the same environment light, the mixed ratio of flashlight to environment light varies, because an amount of light of flashlight for irradiation varies if ISO speed on the photographing side is different.

Then, the control section 7 estimates intensity of environment light (step S 52).

To be concrete, environment light is radiated on the entire image under the similar intensity, or, "information about environment light in the course of photographing" is extracted from tag information because a light source is positioned above the image (direction of "top" in top and bottom), and intensity of environment light is estimated from light characteristics (for example, light characteristics obtained from the table that is prepared in advance and stores types of light sources having high frequency of appearance and light characteristics corresponding to that types of light sources to be correlated) of environment light in the course of photographing (namely, types of light sources such as a fluorescent lamp, a tungsten lamp and sunlight (daylight)) and from tint on the upper portion of the image.

Then, the control section 7 estimates a mixed ratio (mixed proportion) of environment light to flashlight in the area irradiated by flashlight having the highest intensity based on the estimated ratio of intensity of flashlight to intensity of environment light (step S 53), and moves to step S 6 in FIG. 4.

Next, the control section 7 moves to the detection processing for detecting an area where the mixed ratio of environment light to flashlight is not less than a prescribed value (step S 6).

Figure 7:
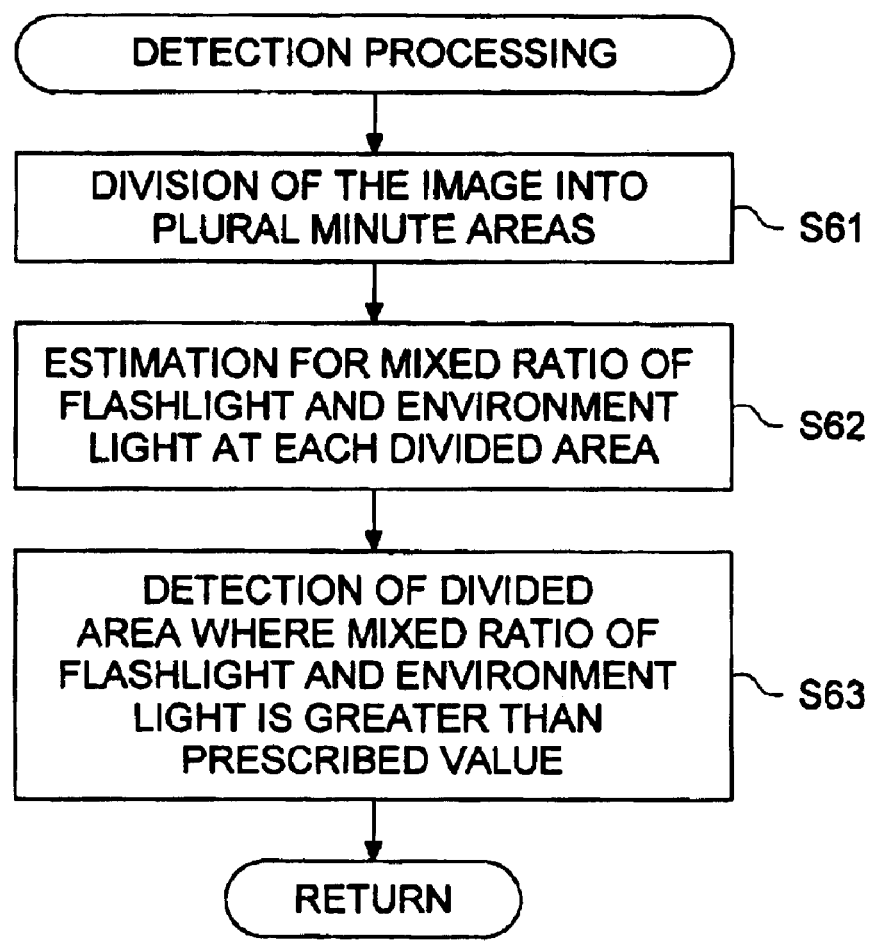
FIG. 7 is a flow chart showing a flow of detection processing.

FIG. 7 is a flow chart showing a flow of the detection processing.

In FIG. 7, control section 7 divides an area of images composed of image data into plural microscopic areas (step S 61).

Next, the control section 7 specifies position X irradiated by flashlight most intensively in each divided area by using "information about a subject area" or "information about a subject position" obtained separately from tag information, and acquires position information for the position X. Then, the control section 7 acquires one part of the divided area each, and calculates distance r from a center of gravity of the acquired area to the position X, to estimate the mixed ratio of flashlight to environment light in each area (step S 62). In this case, an entire image is irradiated by environment light under the mostly uniform intensity, while, the intensity of flashlight is attenuated gradually as a position of the flashlight leaves the area that is irradiated most intensively. Therefore, the mixed ratio in the area obtained under the assumption that flashlight is attenuated in accordance with a function of distance r (for example, attenuation in accordance with the second power of r) is estimated.

Then, the control section 7 detects the divided area where the mixed ratio of environment light to flashlight (namely, the estimated mixed ratio) is equal to or greater than a prescribed value (for example, 80%) (step S 63), and moves to step S 7 in FIG. 4.

Then, the control section 7 judges whether a flesh color is included in the divided area where the mixed ratio of environment light to flashlight is equal to or greater than a prescribed value or not (step S 7). In a concrete way, average values of hue, chroma and lightness are calculated for each divided area, and the values thus calculated are compared with ranges of hue, lightness and chroma which are simulated in advance and are obtained when flashlight and various environment light are applied on an average flesh color portion under the condition wherein the mixed ratio of flashlight is high. Incidentally, the mixed ratio of environment light to flashlight is defined to be, for example, a ratio of a flashlight intensity to the sum of flashlight intensity and environment light intensity.

When the flesh color is judged not to be included in the divided area in this case (step S 7; NO), the control section 7 moves to step S 9. When the flesh color is judged to be included in the divided area in this case (step S 7; YES), the control section 7 detects a microscopic area constituting a continuous area having a prescribed area (for example, an area occupying 6% or more of the total image) from respective microscopic areas judged to include a flesh color, as a flesh color area (step S 8).

Then, the control section 7 receives the results of estimation in each step mentioned above, and determines contents of image processing (step S 9). First, color correction conditions for correcting tint caused by flashlight and environment light are determined, for each microscopic area. For this reason, a correction condition table for light sources and flashlight which are used frequently, and LUT for fine adjustment that is composed of fine adjustment coefficients respectively of intensity of each light and a correction condition corresponding to the intensity, are prepared in advance.

For example, with the types of environment light and flashlight estimated based on "information about environment light in the course of photographing" and "information about flashlight in the course of photographing", the correction condition table is referred to for the correction conditions for environment light and flashlight. Contents of correction conditions described in the aforesaid correction condition table are those which make images exposed under photographing light having various tints basically to be an image with tint exposed under daylight, and for example, if environment light is a fluorescent lamp, conditions to restrain greenish tincture are described, and for a certain type of a light source, it is taken into consideration to make the most of an atmosphere of a place of photographing and of colors born in mind. For example, if environment light is a tungsten lamp, it is taken into consideration to leave yellowish tincture to take care of an atmosphere of a place of photographing and colors born in mind, without adjusting to the tint of daylight.

Further, LUT for fine adjustment is used to refer to the fine adjustment coefficient corresponding to the intensity of each light estimated in steps S 51 and S 52 in estimation processing (see FIG. 6). Then, a value obtained from a correction condition value multiplied by the fine adjustment coefficient is made to be a correction value in the case of irradiation of individual light.

Further, the mixed ratio of flashlight to environment light applied on each microscopic area estimated in step S 62 in detection processing (see FIG. 7) is used to determine processing conditions to correct the tints of mixed light. For example, when a certain microscopic area is irradiated by flashlight and environment light which respectively have mixed ratios of 70% and 30%, the sum of a value representing the correction value (value representing the value of correction condition that is multiplied by a fine adjustment coefficient corresponding to intensity) in the case of irradiation only by a flashlight that is multiplied by 0.7 and of a value representing the correction value (value representing the value of correction condition that is multiplied by a fine adjustment coefficient corresponding to intensity) in the case of irradiation only by an environment light that is multiplied by 0.3 is made to be the correction value for the microscopic area.

Further, with respect to the flesh color area detected in step S 8, processing conditions to correct to the tint of favorable flesh color prepared in advance are added to the aforesaid processing conditions, and for the purpose of making the skin texture to be smooth and for giving soft impression, noise removal processing to restrain intensity of medium cycle component is carried out after conducting a frequency analyzing processing, and processing conditions to restrain contrast are added. Further, the high-frequency component obtained by the frequency analyzing processing, among high density regions surrounded by the flesh color areas or high density regions surrounding the flesh color areas is estimated to be an eye or a hair, thus, sharpness enhancement processing conditions are added.

Incidentally, in step S 4, when an area irradiated by both of environment light and flashlight is judged not to be present, based on judgment of no flash photographing, an image area composed of image data is divided into plural microscopic areas in the same way as in step S 61 in detection processing (see FIG. 7), hue, chroma and lightness are calculated for each divided area in the same way as in step S 7, and the values thus calculated are compared with ranges of hue, lightness and chroma which are simulated in advance and are obtained when environment light is applied on an average flesh color portion under the condition wherein only the environment light is applied, to detect the microscopic area including a flesh color, and a microscopic area constituting a continuous area having a prescribed area is further detected as a flesh color area in the same way as in step S 8, and is subjected to the same processing as in the flesh color area detected in step S 8.

Further, when information about an inclination to a preference of a user has been obtained, or when information usable for estimating an inclination to a preference of a user has been obtained, contents of image processing in the invention are modified based on the obtained or estimated inclination to a preference of a user.

Incidentally, there is possibility that image data which have already been subjected to image processing based on consideration to give an image making a preferable impression when the image is observed an output medium and image data for which image processing in outputting needs to be prohibited based on a specific intention, are mixed in image data indicating exposed images. For the image data stated above, it is preferable that the information to the effect that image processing in outputting is prohibited is described, in advance, on header information and tag information in various types of general purpose image formats represented by JPEG, TIFF and Exif, or an operator instructs prohibition of image processing through operation section 11. In this case, instructions from the header information, tag information and operation section 11 are referred at the beginning of processing, and when image processing is prohibited, and contents of image processing may be determined to be "no image processing".

Then, the control section 7 applies the image processing determined in step S 9 to image data (step S 19). Regarding to the image data compounded by template processing, however, only a portion corresponding to the image data before compounding is made to be subjected to image processing.

Further, the control section 7 outputs image data subjected to image processing to monitor 8, exposure processing section 4, outer printers, image transport section 31 and communication means 17 (step S 11), and terminates image output processing in FIG. 4.

As stated above, in image recording apparatus 1, control section 7 reads images following instructions from operation section 11, and estimates a mixed area of environment light and flashlight, based on tag information added to the image read. Then, the control section 7 estimates the mixed ratio of environment light to flashlight in the mixed area, and detects an area where the mixed ratio is a prescribed value or more. Further, if a flesh color is included in the detected area, the control section 7 determines color correction conditions for the area. In addition, the control section 7 determines contents of image processing to be conducted on image data, based on information about the mixed area, areas other than the mixed area and about flesh color areas obtained through the estimation. Then, the control section 7 conducts image processing on image data based on the determination stated above, and outputs to the outside.

Therefore, the image recording apparatus 1 can cope with various photographing environments and conditions, various photographing apparatuses and image signal generating apparatuses, then conducts prescribed image processing on image data indicating images exposed under plural light sources (for example, a fluorescent lamp and flashlight), and can generates image data that can give favorable impression to an observer.

It is further possible to give images making favorable impression in a simple and general purpose method, without calculating in a highly burdened way, because an estimation is made based on various pieces of information corresponding to image data. In addition, it is also possible to cope flexibly with complicated environments wherein image data indicating exposed images generated by photographing apparatuses such as, for example, a digital camera and an analog camera and image data received through media and communication means are mixed.

Incidentally, the description in the present embodiment is a preferable example of an image processing method relating to the invention, to which, however, the invention is not limited.

When "information about environment light in the course of photographing" and "information about flashlight in the course of photographing" are not recorded as tag information, an image is divided, and hue, chroma and lightness are calculated for each divided area or for each pixel, then, the divided areas or pixels are detected where, in the certain range to be judged as equivalent to white color under various light sources or flashlight from accumulated data, the calculated values of hue, chroma and lightness are included, then a continuous area is detected from the detected divided areas or pixels, and this area is made to be a detected area equivalent to white, thus, it is possible to estimate the information about environment light and information about flashlight from an average value and a central value of the hue values of the detected area equivalent to white.

With respect to "information about flashlight in the course of photographing", in particular, it is possible to measure information about flashlight for predictable main types of apparatuses. Therefore, it is possible to acquire information about flashlight, by storing the aforesaid information in an image processing apparatus or in a storage medium in advance, then, by recognizing a model of the apparatus used in image processing from information such as "a maker name of an image input apparatus" and "a model name of an image input apparatus" and from input information in image processing by an operator, and by referring to information about flashlight corresponding to the model of apparatus.

Further, in the present embodiment, "information about zoom magnification in the course of photographing" is obtained. However, the invention is not limited to this, and it is also possible to arrange so that an effective arrival range for flashlight and other information serving as a means (means to learn accurately a distance between a flashlight source and a subject) to recognize intensity of flashlight applied on a subject, are obtained, in the course of flash photographing, as well as other various information such as information about ISO speed, or to supplement with other information.

For example, "exposure time", "shutter speed", "aperture value", "F value of lens", "subject distance", "focal length of lens", "35 mm camera-converted lens focal length" and "scene for photographing" may be used independently or in combination to estimate information about a zoom magnification.

With respect to "information about a zoom magnification", it is possible to collect information about zoom magnifications corresponding to main models of apparatuses which are predicted to be used, including a photographing apparatus having neither optical zoom lens nor zoom functions. Therefore, it is possible to store information in an image processing apparatus and a recording medium in advance, so that the apparatus model to be used is recognized in the course of image processing and "information about a zoom magnification) corresponding to the model of apparatus is referred.

Further, various estimations necessary to determine contents of image processing may be made by using various pieces of information other than tag information used in the present embodiment. For example, "information about photographing scene" is arranged in tag information, and when the photographing scene is recognized by the "information about photographing scene" to be a portrait (people photography), a principle subject is assumed to be a face of a person, and a face size of a person in an image can be detected by a means to detect a continuous flesh color area employing a known technology, for estimation. Further, a face size of a general person can be estimated by accumulation of data, and a subject distance can be estimated accordingly. When information of reflected flashlight (return information) is given, a subject distance can be estimated roughly based on information about presence of reflected light and intensity. When a plurality of the photographing information are given, accuracy of estimation can naturally be enhanced by judgment of combination of the plural information.

Since images generated by flash photographing are photographed in the environment where environment light and flash light are mixed, characteristics of light controlled vary depending on an area of the image. For example, a subject positioned to be closer to a flash light source is irradiated by light having flashlight characteristics densely, and a subject and a background positioned to be farther from a flash light source, on the contrary, are irradiated by a fluorescent lamp or a tungsten lamp, or by light having sunlight characteristics densely in the case of photographing against light.

Therefore, when determining contents of image processing, it is more preferable to determine based on "information about environment light in the course of photographing", "information about flashlight in the course of photographing", "information about zoom magnification" and "information about ISO speed".

It is more preferable to determine contents of image processing by estimating whether an area irradiated by both of environment light and flashlight is present in the image or not, then, estimating the mixing ratio of environment light and flashlight in the course of photographing, and by detecting an area wherein the mixing ratio of environment light and flashlight in the course of photographing is a prescribed value or more.

It is further preferable to determine contents of image processing in accordance with hue information of an area where the mixing ratio of environment light to flashlight is a prescribed value or more. To be concrete, for example, it is more preferable to determine contents of image processing by judging whether a flesh color is included in the aforesaid area or not.

Further, when estimating whether an area irradiated by both of environment light and flashlight is present in the image or not", it is preferable to use information concerning "information about environment light in the course of photographing" and "information about flashlight in the course of photographing", and it is more preferable to use information concerning "information about environment light in the course of photographing", "information about flashlight in the course of photographing" and "information about a subject distance in the course of photographing".

For example, emission of flashlight can be recognized from "information about flashlight in the course of photographing", and it is possible to estimate that "an area irradiated by both of environment light and flashlight is present in the image", from "information about environment light in the course of photographing", if a light source for environment light is one other than flashlight. Further, by estimating by using "information about flashlight in the course of photographing" and "information about a subject distance in the course of photographing" in combination, environment light that clearly needs flash emission, namely, a fluorescent lamp is recognized, and when a subject distance is a close range, a photographing scene under a fluorescent lamp inside a room is estimated, and it is estimated that an area irradiated by both of environment light and flashlight is present in the image. The method of estimation is not limited to the foregoing, and other useful pieces of information including information concerning photographing scene (for example, a portrait) may be used in combination.

When "estimating the mixing ratio of environment light to flashlight in the course of photographing", it is preferable to use "information about flashlight in the course of photographing", "information about a subject distance in the course of photographing", and at least one of "information about zoom magnification" and "information about ISO speed", and it is more preferable to use a plurality of the aforesaid pieces of information in combination.

For example, a problem that is caused when a subject is irradiated by light wherein environment light and flashlight in the course of photographing are mixed includes one that preference and tint of an observer vary. With respect to existing photographing apparatuses, a silver halide type camera, for example, includes a lens-fitted film unit, a compact camera and an SLR camera, and their grades and functions are various and their capabilities vary greatly. In the silver halide type camera, ISO speeds of films used therein are various, and it is important to estimate intensity of flashlight for determining contents of image processing highly accurately.

By using the aforesaid information, it is possible to simulate highly accurately the characteristics of light wherein environment light and flashlight are mixed in various ratios and the spectral characteristics having an influence on tint. For example, by storing spectral characteristics of various light sources including flashlight in a memory of an image processing apparatus, it is possible to select and estimate spectral characteristics of environment light and of flashlight from light source types recognized by information concerning environment light.

It is possible to estimate intensity of flashlight applied on a subject from a distance between a flashlight source and a subject that is estimated from "information about zoom magnification" and "information about a subject distance" and from "information about ISO speed", and it is possible to calculate spectral characteristics of light wherein environment light and flashlight are mixed in various ratios. A mixing ratio of environment light to flashlight in the course of photographing in a prescribed area may be estimated by the use of the results of the aforesaid calculation.

It is also possible to estimate a mixing ratio of environment light and flashlight in the course of photographing for each of microscopic areas divided from the image, and thereby to correct tint respectively. The mixing ratio of environment light to flashlight described here is defined, for example, by intensity of flashlight to the sum of flashlight intensity and environment light intensity, to which, however, the invention is not limited.

With respect to microscopic areas divided from the image, there may be detected an area where the mixing ratio of environment light to flashlight obtained by the method to "estimate a mixing ratio of environment light to flashlight in the coursed of photographing" is a prescribed value or more. In that case, it is preferable to use "information about a subject area" and "information about a subject position". Since flashlight is emitted toward a subject in general in many cases, information about a position and an area where the mixing ratio of flashlight is high is effective, when processing of detection is conducted in a simple way under the light load. Furthermore, it is preferable to determine contents of image processing in accordance with hue information, regarding the detected "area where the mixing ratio of environment light to flashlight in the coursed of photographing has a value of the prescribed value or more"

Further, when an observer observes an image output, there is a tendency that a person (face, in particular) is looked preponderantly, and therefore, it is preferable to "judge whether a flesh color is included or not" with respect to "an area where the mixing ratio of environment light to flashlight in the course of photographing has a value that is not less than a prescribed value".

As a method to judge whether a flesh color is included or not, it is possible to judge depending on whether or not a microscopic area or a pixel to be judged is included in a range of prescribed hue and lightness corresponding to a flesh color, for example, or, it is possible to select a continuous area as a flesh color area from microscopic areas or pixels included in a range of prescribed hue and lightness corresponding to a flesh color, and thereby to determine contents of image processing by using information of hue, chroma and lightness of this selected area, for heightening precision.

When a person is included in a subject, the person is a principal subject in many cases, and therefore, for heightening precision and for lightening calculation loads, it is effective to utilize "information about a subject area" and "information about a subject position". A method to "judge whether a flesh color is included or not" is not limited to the foregoing.

Further, it is preferable that a continuous area having an area of a prescribed value or more among microscopic areas or pixels judged to be of a flesh color or the aforesaid microscopic areas or pixels judged to be of a flesh color, in a course of "judging whether a flesh color is included or not" is made to be a flesh color area, and this flesh color area is corrected to the prescribed value in terms of hue, chroma and lightness.

It is further preferable to try estimations in the order wherein a method with the highest estimating precision comes first, by judging from characteristics and tendencies of image data corresponding to an environment where image recording apparatus 1 is operated, without being limited to image output processing (see FIG. 4) in the present embodiment.

The invention is not limited to the contents of the aforesaid embodiment, and the invention may be modified appropriately within a range where it does not deviate from its spirit.

(Effect of the Invention)

The technology of the invention makes it possible to realize an image processing method, an image processing apparatus and an image recording apparatus, which give images evaluated by an observer to be appropriate for not only a face (color and texture of a skin, in particular) of a person but also a background, despite images obtained by flash photographing under the condition that environment light and flashlight are different in terms of tint. It is also possible to provide an image processing method that can give images making preferable impression in a simple and general-purpose method without conducting highly-loaded calculation, only by acquiring or estimating various simple and plain pieces of information. It is also possible to realize an image processing method, an image processing apparatus and an image recording apparatus, which can cope with complicated environment wherein image signals indicating exposed images generated by various photographing apparatuses are mixed and are received through media and communication means, by estimating necessary information based on various information corresponding to image signals indicating exposed images.

What is claimed is:

1. An image processing method to conduct an image processing on image signals indicating an image obtained through photographing by a photographing apparatus for generating image signals for output, comprising:
a determining process to determine a content of image processing to be conducted on the image signals based on information about environment light in the course of photographing, information about flashlight in the course of photographing, one information about zoom magnification in the course of photographing and information about ISO speed.

2. The image processing method of claim 1, wherein in the determining process, the content of image processing to be conducted on the image signals is determined further based on information about an object distance from the photographing apparatus in the course of photographing.

3. An image processing method conducting an image processing on image signals indicating an image obtained through photographing by a photographing apparatus and generating image signals for output, comprising:
a mixed area estimating process to estimate whether or not an area irradiated by both of an environment light and a flashlight is present in the image, based on information about environment light in the course of photographing and information about flashlight in the course of photographing, and
a determining process to determine a content of the image processing based on at least one of information about zoom magnification in the course of photographing and information about ISO speed, and on a result of estimation in the mixed area estimating process.

4. The image processing method of claim 3, wherein in the mixed area estimating process, whether or not an area irradiated by both of an environment light and a flashlight is present in the image is estimated, further based on information about an object distance from the photographing apparatus in the course of photographing.

5. An image processing method to conduct an image processing on image signals indicating an image obtained through photographing by a photographing apparatus for generating image signals for output, comprising:

a mixed area estimating process to estimate whether or not an area irradiated by both of an environment light and a flashlight is present in the image, based on information about environment light in the course of photographing and information about flashlight in the course of photographing;

a mixed ratio estimating process to estimate a mixed ratio of flashlight in the course of photographing to environment light in the course of photographing, based on at least one of information about zoom magnification in the course of photographing and information about ISO speed; and a determining process to determine a content of the image processing based on the mixed ratio of flashlight in the course of photographing to environment light in the course of photographing estimated in the mixed ratio estimating process.

6. The image processing method of claim 5, wherein in the mixed area estimating process, whether or not an area irradiated by both of an environment light and a flashlight is present in the image is estimated, further based on information about an object distance from the photographing apparatus in the course of photographing.

7. An image processing method to conduct an image processing on image signals indicating an image obtained through photographing by a photographing apparatus for generating image signals for output, comprising:

a mixed area estimating process to estimate whether or not an area irradiated by both of an environment light and a flashlight is present in the image, based on information about environment light in the course of photographing and information about flashlight in the course of photographing;

a mixed ratio estimating process to estimate a mixed ratio of flashlight in the course of photographing to environment light in the course of photographing, based on at least one of information about zoom magnification in the course of photographing and information about ISO speed;

a detecting process to detect an area where the mixed ratio estimated in the mixed ratio estimating process is not less than a prescribed value; and a determining process to determine a content of the image processing based on a result of the detection in the detecting process.

8. The image processing method of claim 7, wherein in the mixed area estimating process, whether or not an area irradiated by both of an environment light and a flashlight is present in the image is estimated further based on information about an object distance from the photographing apparatus in the course of photographing.

9. The image processing method of claim 5, wherein in the mixed ratio estimating process, the mixed ratio of the flashlight to environment light is estimated further based on information about environment light in the course of photographing, information about flash light in the course of photographing and information about an object distance from the photographing apparatus.

10. The image processing method of claim 9, wherein in the mixed ratio estimating process, the mixed ratio of the flashlight to environment light is estimated further based on information of return of flashlight included in information about flashlight.

11. The image processing method of claim 7, wherein in the detecting process, an area where the mixed ratio has a value that is not less than a prescribed value is detected, based on at least one of information about a subject area and information about a position of a subject.

12. The image processing method of claim 7, wherein in the determining process, the content of the image processing is determined in accordance with hue information of the area detected in the detecting process.

13. The image processing method of claim 7, further comprising a judging process to judge whether or not a flesh color is included in an area detected in the detecting process, wherein in the determining process, the content of image processing is determined in accordance with a result of judgment in the judging process.

14. An image processing method to conduct an image processing on image signals indicating an image obtained through photographing by a photographing apparatus for generating image signals for output, comprising:

a determining process that determines a content of image processing to be conducted on the image signals, based on information about environment light in the course of photographing, information about flashlight in the course of photographing and at least one of information about a subject area and information about a subject position.

15. The image processing method of claim 14, wherein in the determining process, the content of image processing to be conducted on the image signals is determined, further based on information about an object distance from the photographing apparatus in the course of photographing.

16. An image processing method to conduct an image processing on image signals indicating an image obtained through photographing by a photographing apparatus for generating image signals for output, comprising:

a mixed area estimating process to estimate whether or not an area irradiated by both of an environment light and a flashlight is present in the image, based on information about environment light in the course of photographing and information about flashlight in the course of photographing; and a determining process to determine a content of the image processing based on at least one of information about a subject area and information about a subject position, and on a result of the estimation in the mixed area estimating process.

17. The image processing method of claim 16, wherein in the mixed area estimating process, whether or not an area irradiated by both of an environment light and a flashlight is present in the image is estimated further based on information about an object distance from the photographing apparatus in the course of photographing.

18. An image processing method to conduct an image processing on image signals indicating an image obtained through photographing by a photographing apparatus for generating image signals for output, comprising:

a mixed area estimating process to estimate whether or not an area irradiated by both of an environment light and a flashlight is present in the image, based on information about environment light in the course of photographing and information about flashlight in the course of photographing;

a detecting process to detect an area including a principal subject irradiated by flashlight, based on at least one of information about a subject area and information about a subject position; and a determining process to determine a content of the image processing based on a detecting result of the detecting process.

19. The image processing method of claim 18, wherein in the mixed area estimating process, whether an area irradiated by both of an environment light and a flashlight is present in the image or not is estimated, further based on information about an object distance from the photographing apparatus in the course of photographing.

20. The image processing method of claim 18, wherein in the determining process the content of the image processing is determined further based on information about a photographing scene.

21. The image processing method of claim 14, wherein in the determining process, the content of the image processing is determined, further in accordance with hue information of an area where a principal subject irradiated by flashlight is included.

22. The image processing method of claim 14, further comprising:
a judging process that judges whether or not a flesh color is contained in an area where a principal subject irradiated by the flashlight is included, wherein the content of the image processing is determined based on a result of judgment in the judging process.

23. The image processing method of claim 1, wherein the image processing comprises at least one processing out of contrast correction, color balance correction, hue correction, chroma correction, lightness correction, elimination of granulated noise and enhancement of sharpness.

24. The image processing method of claim 1, further comprising, an adjusting process to adjust a degree of at least one processing out of contrast correction, color balance correction, hue correction, chroma correction, lightness correction, elimination of granulated noise and enhancement of sharpness.

25. The image processing method of claim 1, further comprising, a correction process that conducts color correction so that a flesh color area represents a prescribed flesh color when the flesh color area is included in the image.

26. An image processing apparatus to conduct an image processing on image signals indicating images obtained through photographing by a photographing apparatus for generating image signals for output, comprising:
a determining section to determine a content of image processing to be conducted on the image signals based on information about environment light in the course of photographing, information about flashlight in the course of photographing, information about zoom magnification in the course of photographing and information about ISO speed.

27. The image processing apparatus of claim 26, wherein the determining section determines the content of image processing to be conducted on the image signals, further based on information about an object distance from the photographing apparatus in the course of photographing.

28. An image processing apparatus to conduct an image processing on image signals indicating an image obtained through photographing by a photographing apparatus for generating image signals for output, comprising:
a mixed area estimating section to estimate whether or not an area irradiated by both of an environment light and a flashlight is present in the image, based on information about environment light in the course of photographing and information about flashlight in the course of photographing; and
a determining section to determine a content of the image processing based on at least one of information about zoom magnification in the course of photographing and information about ISO speed, and on a result of estimation in the mixed area estimating process.

29. The image processing apparatus of claim 28, wherein the mixed area estimating section estimates whether or not an area irradiated by both of an environment light and a flashlight is present in the image, further based on information about an object distance from the photographing apparatus in the course of photographing.

30. An image processing apparatus to conduct an image processing on image signals indicating an image obtained through photographing by a photographing apparatus for generating image signals for output, comprising:
a mixed area estimating section to estimate whether or not an area irradiated by both of an environment light and a flashlight is present in the image, based on information about environment light in the course of photographing and information about flashlight in the course of photographing;
a mixed ratio estimating section to estimate a mixed ratio of flashlight in the course of photographing to environment light in the course of photographing, based on at least one of information about zoom magnification in the course of photographing and information about ISO speed;
a determining section to determine a content of the image processing based on the mixed ratio of flashlight in the course of photographing to environment light in the course of photographing estimated by the mixed ratio estimating section.

31. The image processing apparatus of claim 30, wherein the mixed area estimating section estimates whether or not an area irradiated by both of an environment light and a flashlight is present in the image, further based on information about an object distance from the photographing apparatus in the course of photographing.

32. An image processing apparatus to conduct an image processing on image signals indicating an image obtained through photographing by a photographing apparatus for generating image signals for output, comprising:
a mixed area estimating section to estimate whether or not an area irradiated by both of an environment light and a flashlight is present in the image, based on information about environment light in the course of photographing and information about flashlight in the course of photographing;
a mixed ratio estimating section to estimate a mixed ratio of flashlight in the course of photographing to environment light in the course of photographing, based on at least one of information about zoom magnification in the course of photographing and information about ISO speed; and
a determining section to determine a content of the image processing based on the mixed ratio of flashlight in the course of photographing to environment light in the course of photographing estimated in the mixed ratio estimating process.

33. The image processing apparatus of claim 32, wherein the mixed area estimating section estimates whether or not an area irradiated by both of an environment light and a flashlight is present in the image, further based on information about an object distance from the photographing apparatus in the course of photographing.

34. The image processing apparatus of claim 30, wherein the mixed ratio estimating section estimated a mixed ratio of the flashlight to environment light, further based on information about environment light in the course of photographing, information about flashlight in the course of photographing and information about an object distance from the photographing apparatus.

35. The image processing apparatus of claim 34, wherein the mixed ratio estimating section estimates a mixed ratio of the flashlight to environment light, further based on information of return of flashlight included in information about flashlight.

36. The image processing apparatus of claim 32, wherein the detecting section detects an area where the mixed ratio is not less than a prescribed value, based on at least one of information about a subject area and information about a subject position.

37. The image processing apparatus of claim 32, wherein the determining section determines the content of image processing in accordance with hue information of an area detected by the detecting section.

38. The image processing apparatus of claim 32, further comprising a judging section to judge whether or not a flesh color is included in the area detected by the detecting section, wherein the determining section determines the content of image processing in accordance with a result of judgment in the judging section.

39. An image processing apparatus to conduct an image processing on image signals indicating images obtained through photographing by a photographing apparatus for generating image signals for output, comprising a determining section that determines a contents of the image processing to be conducted on the image signals, based on information about environment light in the course of photographing, information about flashlight in the course of photographing and at least one of information about a subject area and information about a subject position.

40. The image processing apparatus of claim 39, wherein the determining section determines the content of the image processing to be conducted on the image signals, further based on information about a subject distance from the photographing apparatus in the course of photographing.

41. An image processing apparatus to conduct an image processing on image signals indicating an image obtained through photographing by a photographing apparatus and generating image signals for output, comprising:
- a mixed area estimating section to estimate whether or not an area irradiated by both of an environment light and a flashlight is present in the image, based on information about environment light in the course of photographing and information about flashlight in the course of photographing; and
- a determining section determine a content of the image processing based on at least one of information about a subject area and information about a subject position, and on the results of the estimation conducted by the mixed area estimating section.

42. The image processing apparatus of claim 41, wherein the mixed area estimating section estimates whether or not an area irradiated by both of environment light and flashlight is present in the image, further based on information about a subject distance from the photographing apparatus in the course of photographing.

43. An image processing apparatus to conduct an image processing on image signals indicating an image obtained through photographing by a photographing apparatus for generating image signals for output, comprising:
- a mixed area estimating section to estimate whether or not an area irradiated by both of an environment light and a flashlight is present in the image, based on information about environment light in the course of photographing and information about flashlight in the course of photographing;
- a detecting section to detect an area including a principal subject irradiated by flashlight, based on at least one of information about a subject area and information about a subject position; and
- a determining section to determine a content of the image processing based on a result of the results of the detection by the detecting section.

44. The image processing apparatus of claim 43, wherein the mixed area estimating section estimates whether an area irradiated by both of an environment light and a flashlight is present in the image or not, further based on information about an object distance from the photographing apparatus in the course of photographing.

45. The image processing apparatus of claim 43, wherein the determining section determines the content of the image processing, further based on information about a photographing scene.

46. The image processing apparatus of claim 39, wherein the determining section determines the content of the image processing, further in accordance with hue information of an area where a principal subject irradiated by flashlight is included.

47. The image processing apparatus of claim 39, further comprising:
- a judging section to judge whether or not a flesh color is contained in an area where a principal subject irradiated by the flashlight is included, wherein the determining section determines the content of the image processing based on a result of judgment by the judging section.

48. The image processing apparatus of claim 26, wherein the image processing comprises at least one processing out of contrast correction, color balance correction, hue correction, chroma correction, lightness correction, elimination of granulated noise and enhancement of sharpness.

49. The image processing apparatus of claim 26, further comprising, an adjusting section to adjust a degree of at least one processing out of contrast correction, color balance correction, hue correction, chroma correction, lightness correction, elimination of granulated noise and enhancement of sharpness.

50. The image processing apparatus of claim 26, further comprising, a correction section to conduct color correction so that a flesh color area represents a prescribed flesh color when the flesh color area is included in the image.

51. An image recording apparatus to conduct an image processing on image signals indicating images obtained through photographing by a photographing apparatus for generating image signals for output, and to record the image signal for output, comprising:
- a determining section to determine a content of image processing to be conducted on the image signals based on information about environment light in the course of photographing, information about flashlight in the course of photographing, information about zoom magnification in the course of photographing and information about ISO speed.

52. The image recording apparatus of claim 51, wherein the determining section determines the content of image processing to be conducted on the image signals, further based on information about an object distance from the photographing apparatus in the course of photographing.

53. An image recording apparatus to conduct an image processing on image signals indicating an image obtained through photographing by a photographing apparatus for generating image signals for output, and to record the image signals for output, comprising:
- a mixed area estimating section to estimate whether or not an area irradiated by both of an environment light and a flashlight is present in the image, based on information about environment light in the course of photographing and information about flashlight in the course of photographing; and a determining section to determine a content of the image processing based on at least one of information about zoom magnification in the course of photographing and information about ISO speed, and on a result of estimation in the mixed area estimating process.

54. The image recording apparatus of claim 53, wherein the mixed area estimating section estimates whether or not an area irradiated by both of an environment light and a flashlight is present in the image, further based on information about an object distance from the photographing apparatus in the course of photographing.

55. An image recording apparatus to conduct an image processing on image signals indicating an image obtained through photographing by a photographing apparatus for generating image signals for output, and to record the image signals for output comprising:

a mixed area estimating section to estimate whether or not an area irradiated by both of an environment light and a flashlight is present in the image, based on information about environment light in the course of photographing and information about flashlight in the course of photographing;

a mixed ratio estimating section to estimate a mixed ratio of flashlight in the course of photographing to environment light in the course of photographing, based on at least one of information about zoom magnification in the course of photographing and information about ISO speed;

a determining section to determine a content of the image processing based on the mixed ratio of flashlight in the course of photographing to environment light in the course of photographing estimated by the mixed ratio estimating section.

56. The image recording apparatus of claim 55, wherein the mixed area estimating section estimates whether or not an area irradiated by both of an environment light and a flashlight is present in the image, further based on information about an object distance from the photographing apparatus in the course of photographing.

57. An image recording apparatus to conduct an image processing on image signals indicating an image obtained through photographing by a photographing apparatus for generating image signals for output, and to record the image signals for output comprising:

a mixed area estimating section to estimate whether or not an area irradiated by both of an environment light and a flashlight is present in the image, based on information about environment light in the course of photographing and information about flashlight in the course of photographing;

a mixed ratio estimating section to estimate a mixed ratio of flashlight in the course of photographing to environment light in the course of photographing, based on at least one of information about zoom magnification in the course of photographing and information about ISO speed; and a detecting section to detect an area where the mixed ratio estimated by the mixed ratio estimating section is not less than a prescribed value; and a determining section to determine a content of the image processing based on a result of the detection by the detecting section.

58. The image recording apparatus of claim 57, wherein the mixed area estimating section estimates whether or not an area irradiated by both of an environment light and a flashlight is present in the image, further based on information about an object distance from the photographing apparatus in the course of photographing.

59. The image recording apparatus of claim 55, wherein the mixed ratio estimating section estimated a mixed ratio of the environment light and flashlight, further based on information about environment light in the course of photographing, information about flashlight in the course of photographing and information about an object distance from the photographing apparatus.

60. The image recording apparatus of claim 59, wherein the mixed ratio estimating section estimates a mixed ratio of the flashlight to environment light, further based on information of return of flashlight included in information about flashlight.

61. The image recording apparatus of claim 57, wherein the detecting section detects an area where the mixed ratio is not less than a prescribed value, based on at least one of information about a subject area and information about a subject position.

62. The image recording apparatus of claim 57, wherein the determining section determines the content of image processing in accordance with hue information of an area detected by the detecting section.

63. The image recording apparatus of claim 57, further comprising a judging section to judge whether or not a flesh color is included in the area detected by the detecting section, wherein the determining section determines the content of image processing in accordance with a result of judgment in the judging section.

64. An image recording apparatus to conduct an image processing on image signals indicating images obtained through photographing by a photographing apparatus for generating image signals for output, and to record the image signals for output, comprising:

a determining section to determine a contents of the image processing to be conducted on the image signals, based on information about environment light in the course of photographing, information about flashlight in the course of photographing and at least one of information about a subject area and information about a subject position.

65. The image recording apparatus of claim 64, wherein the determining section determines the content of the image processing to be conducted on the image signals, further based on information about a subject distance from the photographing apparatus in the course of photographing.

66. An image recording apparatus to conduct an image processing on image signals indicating an image obtained through photographing by a photographing apparatus and generating image signals for output, and to record the image signals for output, comprising:

a mixed area estimating section to estimate whether or not an area irradiated by both of an environment light and a flashlight is present in the image, based on information about environment light in the course of photographing and information about flashlight in the course of photographing; and a determining section to determine a content of the image processing based on at least one of information about a subject area and information about a subject position, and on the results of the estimation conducted by the mixed area estimating section.

67. The image recording apparatus of claim 66, wherein the mixed area estimating section estimates whether or not an area irradiated by both of environment light and flashlight is present in the image, further based on information about a subject distance from the photographing apparatus in the course of photographing.

68. An image recording apparatus to conduct an image processing on image signals indicating an image obtained through photographing by a photographing apparatus and generating image signals for output, and to record the image signals for output, comprising:

a mixed area estimating section to estimate whether or not an area irradiated by both of an environment light and a flashlight is present in the image, based on information about environment light in the course of photographing and information about flashlight in the course of photographing;

a detecting section to detect an area including a principal subject irradiated by flashlight, based on at least one of information about a subject area and information about a subject position; and a determining section to determine a content of the image processing based on a result of the results of the detection by the detecting section.

69. The image recording apparatus of claim 68, wherein the mixed area estimating section estimates whether or not an area irradiated by both of an environment light and a flashlight is present in the image, further based on information about an object distance from the photographing apparatus in the course of photographing.

70. The image recording apparatus of claim 68, wherein the determining section determines the content of the image processing, further based on information about a photographing scene.

71. The image recording apparatus of claim 64, wherein the determining section determines the content of the image processing, further in accordance with hue information of an area where a principal subject irradiated by flashlight is included.

72. The image recording apparatus of claim 64, further comprising:

a judging section to judge whether or not a flesh color is contained in an area where a principal subject irradiated by the flashlight is included, wherein the determining section determines the content of the image processing based on a result of judgment by the judging section.

73. The image recording apparatus of claim 51, wherein the image processing comprises at least one processing out of contrast correction, color balance correction, hue correction, chroma correction, lightness correction, elimination of granulated noise and enhancement of sharpness.

74. The image recording apparatus of claim 51, further comprising, an adjusting section to adjust a degree of at least one processing out of contrast correction, color balance correction, hue correction, chroma correction, lightness correction, elimination of granulated noise and enhancement of sharpness.

75. The image recording apparatus of claim 51, further comprising, a correction section to conduct color correction so that a flesh color area represents a prescribed flesh color when the flesh color area is included in the image.

76. The image recording apparatus of claim 51, further comprising a recording section to records the image signals for output on a recording medium, wherein the recording section prints the image signals for output on a printing medium for outputting.

77. The image recording apparatus of claim 51, further comprising a recording section to records the image signals for output on a recording medium, wherein the recording section records the image signals for output on a silver halide type photographic paper for outputting.

78. The image recording apparatus of claim 51, further comprising a recording section to records the image signals for output on a recording medium, wherein the recording section prints the image signals for output on a printing medium with an inkjet printing method for outputting.

79. The image recording apparatus of claim 51, further comprising a recording section to records the image signals for output on a recording medium, wherein the recording section prints the image signals for output on a printing medium with an electrophotographic printing method for outputting.

80. The image recording apparatus of claim 51, further comprising a recording section to records the image signals for output on a recording medium, wherein the recording section prints the image signals for output on a printing medium with a sublimation printing method for outputting.

81. The image recording apparatus of claim 51, further comprising a recording section to records the image signals for output on a recording medium, wherein the recording section prints the image signals for output on a printing medium with a thermal printing method for outputting.

82. The image recording apparatus of claim 51, further comprising a recording section to records the image signals for output on a recording medium, wherein the recording section records the image signals for output on a recording medium as digital data.

83. The image recording apparatus of claim 82, wherein the recording medium is at least one of CD-R, CD-RW, MD, a memory card, an IC card, a flexible disk and a magneto-optical disk.

* * * * *